United States Patent [19]

Bojanek et al.

[11] 3,959,596
[45] May 25, 1976

[54] TIME DIVISION SWITCHING NETWORK

[75] Inventors: Robert J. Bojanek, Brookline;
Robert G. Field, Millis; Marvin S. Mason, Lexington, all of Mass.

[73] Assignee: GTE Sylvania Incorporated, Stamford, Conn.

[22] Filed: May 30, 1975

[21] Appl. No.: 582,258

[52] U.S. Cl. .......................... 179/15 AT; 179/15 AQ
[51] Int. Cl.² ........................................... H04Q 11/04
[58] Field of Search ........ 179/15 AT, 15 AQ, 15 A, 179/18 H, 15 BA

[56] References Cited
UNITED STATES PATENTS

| | | | |
|---|---|---|---|
| 3,678,205 | 5/1972 | Cohen | 179/15 AQ |
| 3,715,505 | 2/1973 | Gordon | 179/15 AQ |
| 3,761,894 | 9/1973 | Pilc | 179/15 AQ |
| 3,860,761 | 1/1975 | O'Neill | 179/18 H |

*Primary Examiner*—David L. Stewart
*Attorney, Agent, or Firm*—David M. Keay; Elmer J. Nealon; Norman J. O'Malley

[57] ABSTRACT

A TDM switching network for a communication system having 17 input transmission lines for carrying TDM digital signals in 64 input channels on each input line and having 15 output transmission lines for carrying TDM digital signals in 64 output channels on each output line. The TDM switching network establishes connections between selected input and output channels in accordance with address instructions having A and B address segments each designating a particular channel of a particular transmission line. The switching network includes 15 switching matrices (plus a spare). Each matrix is connected to all 17 of the input transmission lines and to a different one of the output transmission lines. Each switching matrix includes a data memory which can store a data bit for each channel of each transmission line. Each matrix also includes an address memory which can store an address segment for each channel of the associated output transmission line at a corresponding storage location. An address instruction is transmitted to all the switching matrices and comparisons are made by each matrix to determine if the transmission line designated by either address segment designates the output transmission line associated with the matrix. The matrix having the output line designated by the A address segment loads the B address segment in its address memory in the storage location corresponding to the channel designated by the A address segment. Similarly, the A address segment is placed in the matrix and at the storage location corresponding to the transmission line and channel designated by the B address segment. The storage locations of an address memory are read out in sequence by corresponding channels. If an address segment is read out of the address memory, the data bit designated thereby is selected from the data memory and applied to the output transmission line of the matrix in the channel corresponding to the storage location the address segment occupies in the address memory.

17 Claims, 20 Drawing Figures

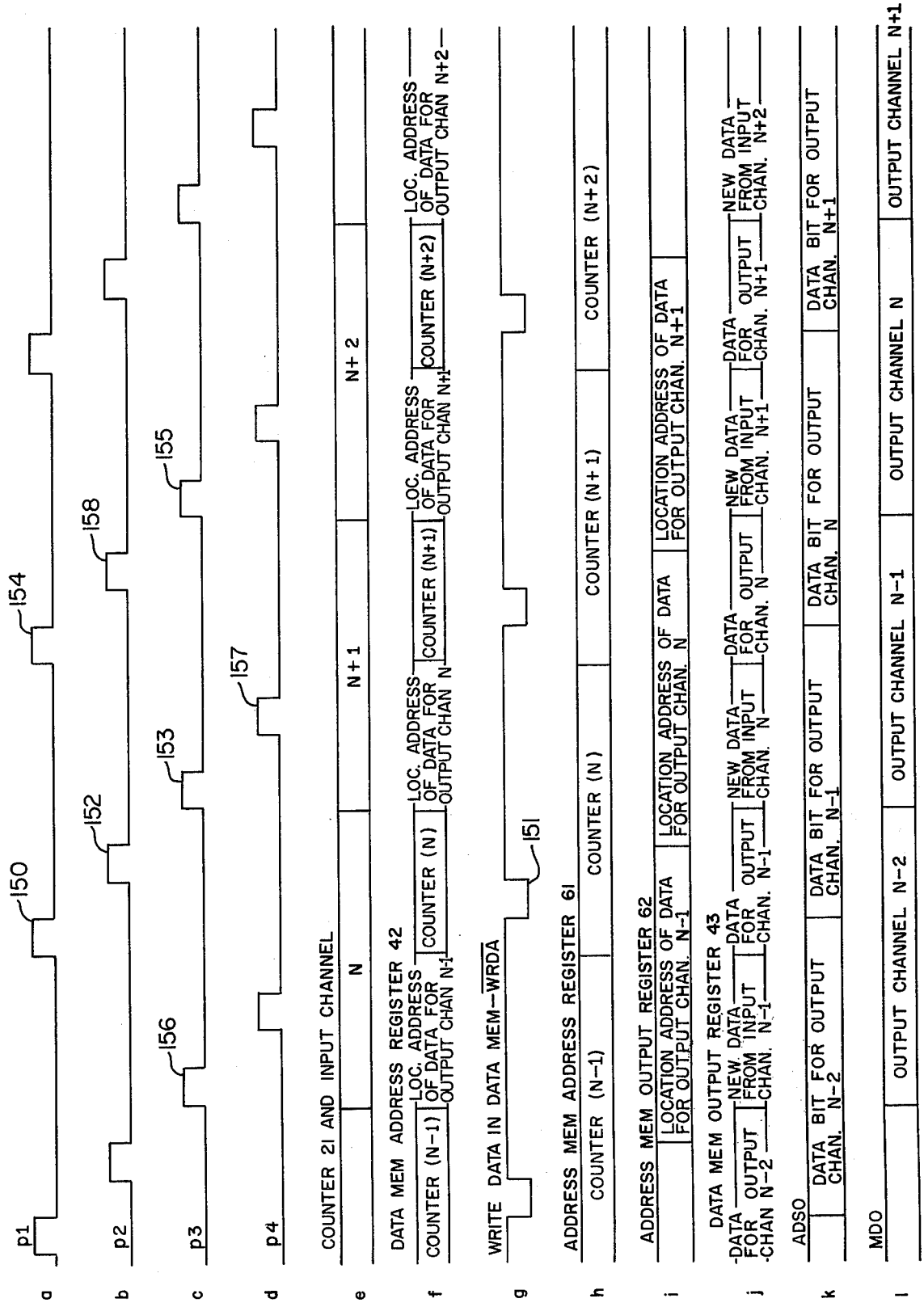
FIG. 5 PART A

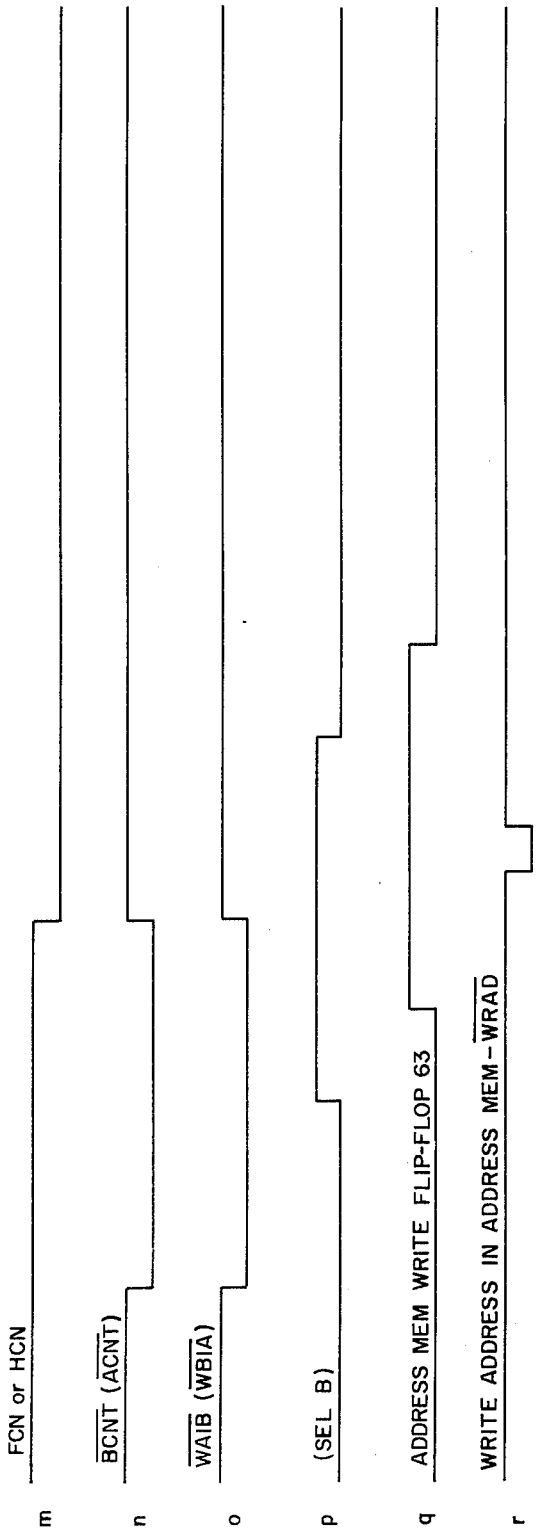
FIG. 5 PART B

TIME DIVISION SWITCHING NETWORK

BACKGROUND OF THE INVENTION

This invention relates to digital communication switching systems. More particularly, it is concerned with apparatus for switching time division multiplexed (TDM) signals.

Among the problems present in many known TDM switching systems is the problem of blocking. That is, once a connection between two channels has been established certain other connections are not possible. A non-blocking TDM switching system is described in U.S. Pat. No. 3,678,205 entitled "Modular Switching Network" which issued on July 18, 1972 to Gerald Cohen and Maurice I. Crystal and is assigned to the assignee of the present application. The network described in the application employs a plurality of switching modules, one for each output transmission line. All the incoming data on all the input transmission lines to the network is stored in a data memory in each of the switching modules. Each module also includes a memory for storing connection address information identifying data in the data memory to be transmitted on the output transmission line of the module. The network permits the data present in any channel on any input transmission line to be applied to any channel on any output transmission line through the particular switching module associated with the desired output transmission line. Operation of the switching modules to establish each connection is under the control of a control computer and a timing and control unit.

SUMMARY OF THE INVENTION

An improved time division switching network for establishing connections between selected input channels of selected input transmission lines and selected output channels of selected output transmission lines of a TDM communication system is provided by a time division network in accordance with the present invention. The system includes a plurality of input transmission lines for carrying time division multiplexed digital signals in a predetermined number of input channels on each input transmission line and a plurality of output transmission lines for carrying time division multiplexed digital signals in an equal predetermined number of output channels on each output transmission line.

The network includes an address information line for transmitting digital address information words. Each word has a first segment which designates both a particular one of each of the pluralities of transmission lines and a particular one of the predetermined number of channels of each transmission line. Each word also has a second segment which designates both a particular one of each of the pluralities of transmission lines and a particular one of the predetermined number of channels of each transmission line.

The network also includes a plurality of switching matrices each of which is coupled to each of the plurality of input transmission lines and to a different one of the plurality of output transmission lines. Each switching matrix includes a data memory means which is coupled to each of the plurality of input transmission lines. Each data memory means is capable of storing a digital signal for each input channel of each input transmission line at a corresponding storage location. Each switching matrix also includes an address memory means which is capable of storing a segment of an address information word for each output channel of the output transmission line associated with the matrix at a corresponding storage location. Within each matrix an address input storage means is coupled to the address information line. The address input storage means receives and stores a digital address information word transmitted on the address information line. A first address comparison means produces an indication when the second segment of an address information word stored in the address input storage means designates the output transmission line associated with that matrix. A second address comparison means produces an indication designating the particular channel designated by the second segment of an address information word stored in the input storage means.

An address memory input control means is coupled to the address input storage means, to the first address comparison means, to the second address comparison means, and to the address memory means. The address memory input control means causes the address memory means to store the first segment of the address information word in response to an indication from the first address comparison means. A memory address control means is coupled to the data memory means and also to the address memory means for addressing the respective storage locations of both memory means in recurring sequence by corresponding channels. The memory address control means causes the data memory means to store digital signals at the storage locations corresponding to the associated input channel. The memory address control means also causes the first segment of an address information word being stored in the address memory means to be stored in the storage location corresponding to the channel designated by the second segment of the address information word.

An address memory output means is coupled to the address memory means for reading out the first segment of an address information word stored at the storage location addressed by the memory address control means. The memory address control means is also coupled to the address memory output means for addressing the storage locations of the data memory means corresponding to the channel designated by the first segment of an address information word read out of the address memory means by the address memory output means. A data output means is coupled to the data memory means for reading out the digital signals at the storage locations in the data memory means addressed by the memory address control means and corresponding to the channel designated by the first segment of the address information word read out of the address memory means. The data output means selects the particular digital signal associated with the particular input transmission line designated by the first segment of the address information word read out of the address memory means and applies the selected digital signal to the associated output transmission line in the output channel designated by the second segment of the address information word.

BRIEF DESCRIPTION OF THE DRAWINGS

Additional objects, features, and advantages of time division switching networks in accordance with the present invention will be apparent from the following detailed discussion together with the accompanying drawings wherein:

FIG. 5 is a timing chart useful in explaining the operation of a switching matrix;

Standard well-known symbols and notations are employed throughout the drawings to designate various logic components.

DETAILED DESCRIPTION OF THE INVENTION

General

Figure 1:
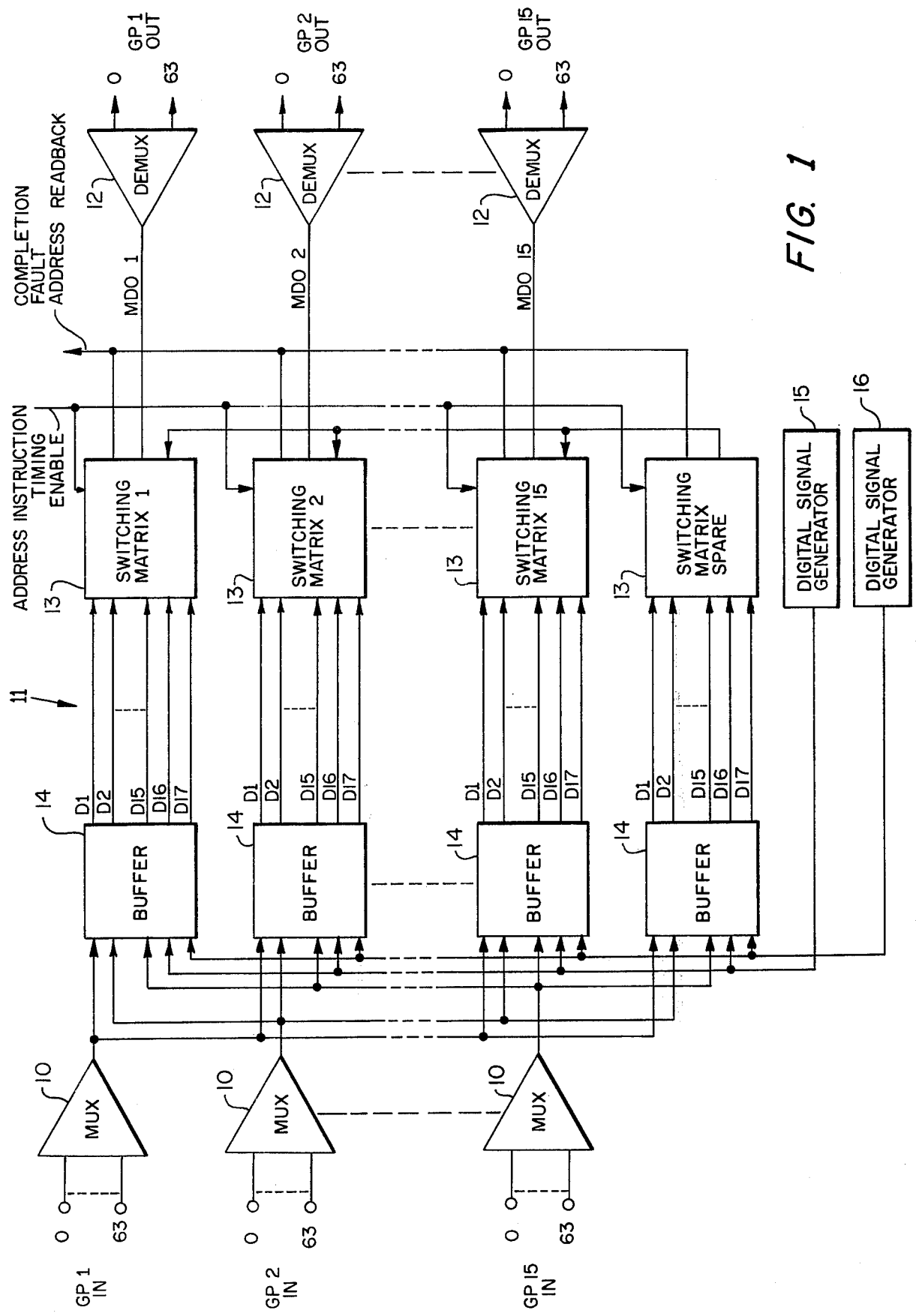
FIG. 1 is a block diagram illustrating certain elements of a digital communication system including a switching network in accordance with the present invention.

FIG. 1 is a block diagram illustrating a portion of a specific embodiment of a digital communication system employing a TDM switching network in accordance with the present invention. The system includes 15 groups of 64 input lines each from subscribers. For each input line there is a corresponding output line to the subscriber, also arranged in 15 groups of 64 lines each. Each group of 64 input lines is connected to a multiplexer 10 which time division multiplexes the inputs into 64 channel time slots on a single input transmission line. In the specific embodiment under discussion the data bit rate on each subscriber line is 32 KHz; therefore, the multiplexed data bit rate is 2.048 MHz. The outputs of the multiplexers 10 are applied through buffers 14 to a digital switching network 11 in accordance with the present invention. The switched digital TDM signals from the switching network 11 are conducted on output lines to fifteen demultiplexers 12. Each of the demultiplexers 12 demultiplexes the TDM signals in the 64 channels to a corresponding group of 64 output lines.

As illustrated in FIG. 1 the switching network 11 includes sixteen identical switching matrices or modules 13. The network also includes two digital signal generators 15 and 16 connected to the buffers 14. Input transmission lines D1 through D15 each transmit the 64 TDM channels of buffered digital signals from the multiplexers 10 for the corresponding group of subscriber lines GP1 through GP15, respectively. All the input transmission lines D1 through D15 and input lines D16 and D17 from the signal generators 15 and 16 are connected in a similar manner to all 16 of the switching matrices 13. Each switching matrix of the first 15 is connected to a different one of 15 output lines MDO 1 through MDO 15 to a corresponding one of 15 demultiplexers 12. The 16th switching matrix is a spare and its output is connected to the other 15 switching matrices.

Address instructions to the switching network as well as timing and enabling pulses are applied to all the matrices. Various signals for monitoring the operation of the network are produced by the matrices.

Figure 2:
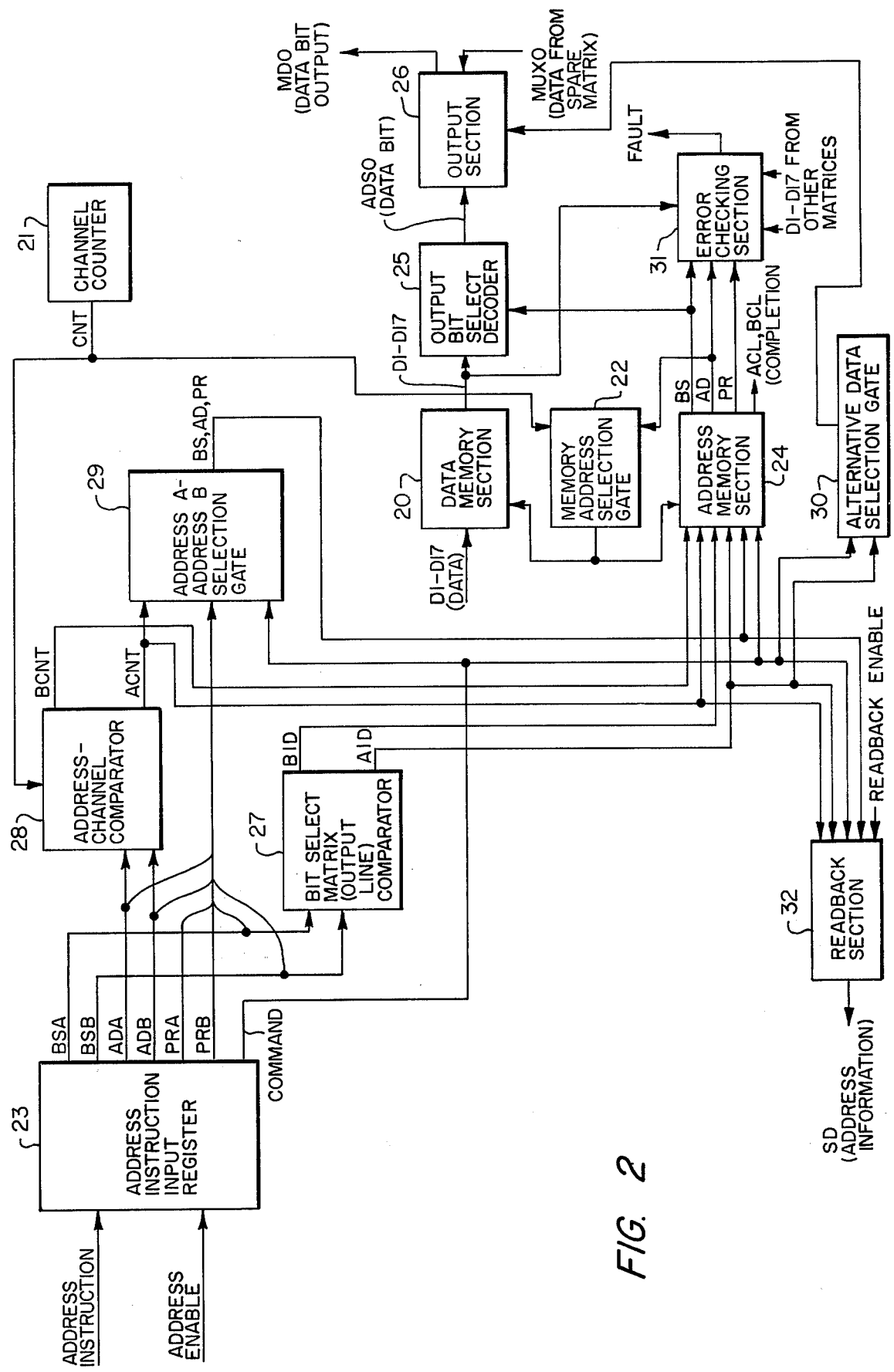
FIG. 2 is a block diagram of an individual switching matrix within the network.

FIG. 2 is a block diagram of an individual switching matrix 13 in accordance with the present invention. The block diagram of FIG. 2 is simplified showing only major functional blocks and major items of information which flow between them. As indicated previously, each matrix of the network is associated with a different output transmission line, except for the 16th matrix which is a spare.

Figure 4A:
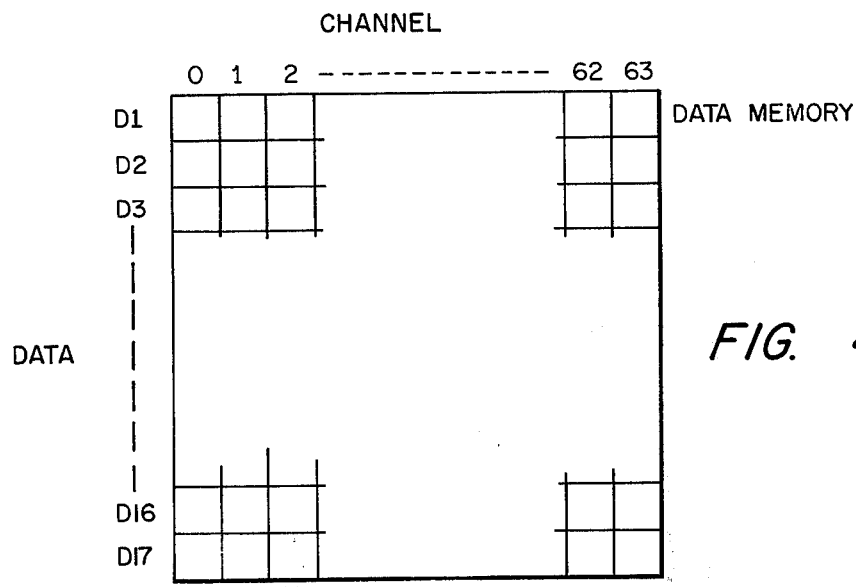
FIGS. 4A and 4B are charts illustrating the arrangement of data and address information in a data memory and an address memory of a switching matrix.

All of the input transmission lines D1 through D17 which may contain data bits in 64 TDM channels are connected to the data memory section 20. FIG. 4A is a chart illustrating the arrangement of data in the data memory. The data is stored in a 17 by 64 array of storage locations. A single bit is stored for each input line during each channel time slot. New data is entered in place of the old during the appropriate channel time slots. The locations for each channel of the data memory section are addressed in recurring sequence by the count from a channel counter 21 which is synchronized with the input channel time slots. The count from the channel counter is applied to the data memory section by a memory address selection gate 22 when data is being written into the memory section 20. The input lines D1 through D17 are connected to the data memory section 20 of all sixteen matrices of the network. Each data memory section of the network thus contains the same data field as illustrated in FIG. 4A.

Figure 3:
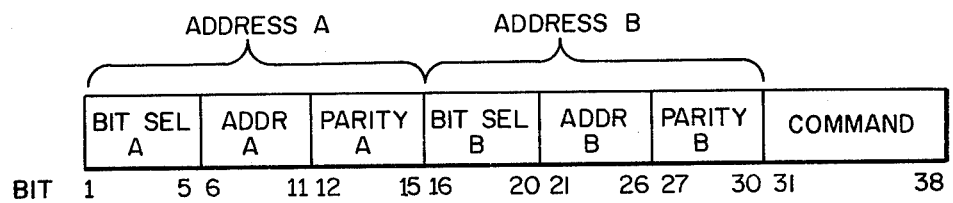
FIG. 3 is a representation illustrating the format of address instructions employed by the switching network of an invention.

Address instructions are applied to all the matrices of the network on an address information line and stored in input registers 23 when appropriately enabled. An address instruction can be transmitted at any time independently of the TDM data cycle. The bits of an address instruction are transmitted in series and in the specific embodiment under discussion the address instruction is transmitted at a bit range of 1.152 MHz. The format of an address instruction is illustrated by the representation of FIG. 3. An address instruction consists of 38 bits. A first segment of 15 bits designates one address labeled the A address, a second segment of 15 bits designates another address labeled the B address, and the last eight bits indicate an operation command.

The first five bits of the first segment labeled bit select A designate a transmission line, either one of seventeen input lines or one of 15 output lines. The next six bits labeled address A designate a particular one of the 64 channels. The next four bits labeled parity A are parity check bits used in checking the address A information. The address B information segment similarly contains bit select B, address B, and parity B portions. The command bits, the last eight in the address instruction, cause the matrix to perform certain specific operations. These include a full connection in which the input transmission line and channel designated by the A address is connected to the output transmission line and channel designated by the B address and the input transmission line and channel designated by the B address is connected to the output transmission line and channel designated by the A address. If the command calls for a half connect, the input transmission line and channel designated by the A address is connected to the output transmission line and channel designated by the B address. A disconnect command calls for erasing the connections previously established between the designated transmission lines and channels. Other commands cause the matrix to employ the spare switching matrix as a source of data, cause address information to be read out of the matrix, and provide for resetting and testing.

Figure 4B:
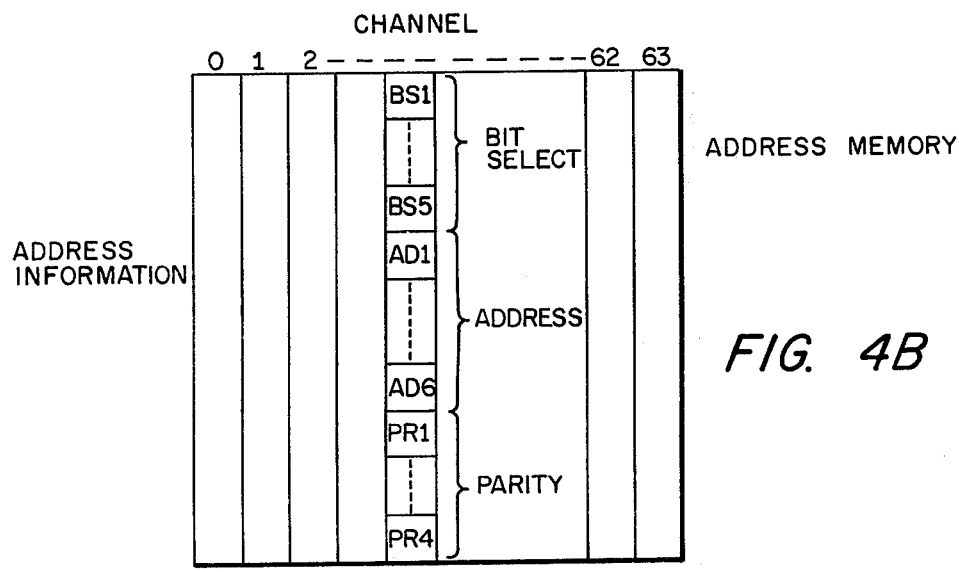

Address information is stored in the address memory section 24 of appropriate matrices as determined by the address instructions. The arrangement of address information in an address memory section 24 is illustrated in FIG. 4B. The address memory section has storage locations for 64 address segments arranged by channels. For a full connection between two channels the A address segment of the address information is stored in the particular switching matrix designated by the bit select BS portion of the B address. It is located in the storage location designated by the address portion AD of the B address. The B address segment is placed in the particular matrix designated by the bit select BS portion of the A address at the storage location corresponding to the channel designated by the address portion AD of the A address. The manner of storing address information held in the input register 23 in the address memory section 24 is described hereinbelow.

During the time slot of each channel the data bits on the seventeen input lines D1 through D17 are entered in the appropriate storage locations of the data memory section 20 as indicated in FIG. 4A. In synchronism with the addressing of the storage locations of the data memory section 20 by associated channels the storage locations of the corresponding channels of the address memory section 24 are also caused to be addressed by the memory address selection gate 22. The presence of a segment of address information in a particular channel location indicates that the data bit at the location in the data memory section 20 as designated by the segment is to be transmitted on the output transmission line of the matrix in the time slot of the output channel designated by the channel location of the segment in the address memory section 24.

When a storage location of the address memory section 24 is addressed, the address segment in that storage location, if present, is read out and the six bits of the address portion AD are applied to the memory address selection gate 22. The memory address selection gate 22 addresses the 17 storage locations of the data memory section 20 associated with the channel designated by the address portion AD read out of the address memory section. The 17 data bits at the addressed storage locations are read out and applied to an output bit select decoder 25.

The five select bits BS of the address segment read out of the address memory section 24 are also applied to the output bit select decoder 25. These bits designate one of the 17 input transmission lines and the data bit associated with that particular input line is selected and transmitted to an output section 26. The output section 26 transmits the data bit on its output transmission line in the proper time slot for the output channel corresponding to the storage location of the address segment in the address memory section 24.

As mentioned previously the address instruction is received in serial bit format and entered in the input register 23. The bit select A BSA and bit select B BSB bits are applied to a bit select-matrix (output line) comparator 27 which determines if either or both of the address segments designate the particular output line of that switching matrix. If such a determination is made, the comparator 27 produces an AID or BID signal, respectively.

The address A ADA and address B ADB address bits are compared with the count of the channel counter 21 in an address-channel comparator 28. When coincidence is obtained indicating that the address bits ADA or ADB designate the input channel on which data is being received, the comparator 28 produces an ACNT or a BCNT signal, respectively. These signals are used to control the writing of address information in the address memory section 24.

All the address information including parity bits is supplied to an address A-address B selection gate 29. Under control of signals from the address-channel comparator 28 this gate determines whether the A or B address segment will be applied to the address memory section 24. If the address-channel comparator 28 indicates coincidence with the address bits of the A address segment ADA, the B address segment is gated out. If the comparator 28 indicates coincidence with the address bits of the B address segment ADB, the A address segment is gated out. The presence of a disconnect command causes the selection gate 29 to produce all 1's which if written into a storage location of the address memory section clears that location.

Signals from the bit select-matrix (output line) comparator 27 and the address-channel comparator 28 together with a full connect, half connect, or disconnect command from the input register 23 are applied to a control portion of the address memory section 24. The combination of a BID signal and BCNT signal indicates that the A address segment BS, AD, PR from the address A-address B selection gate 29 is to be written into the address memory section 24. The particular storage location is determined by the count from the channel counter 21 applied through the memory address selection gate 22 at the time of coincidence producing the BCNT signal. Similarly, during a full connect command and the combination of an AID and an ACNT signal the B address segment is written into the address memory section 24 at the storage location determined by the address bits of the A address segment ADA.

The matrix also includes an alternative data selection gate 30 which responds to an appropriate command in the address instruction to enable the matrix to use the data memory section of the spare matrix rather than its own. The data from the spare matrix (MUXO) is applied to the output section 26. If the appropriate command is received by the alternative data selection gate 30, it causes the data bit from the spare matrix (MUXO) rather than the data bit from its own data memory section (ADSO) to be transmitted as the output (MDO) to the demultiplexer.

An error checking section 31 includes various circuits for checking the operation of the matrix and for producing signals indicating problems. The data field in the data memory section is checked with that in adjacent matrices to insure that they are the same. The bit select BS and address bits AD of the address segment read out of the address memory section are checked against their parity bits PR.

A readback section 32 responds to an appropriate command and when enabled causes the address segment being placed in the address memory section 24 to be transmitted on line SD in serial bit format.

TIMING

As explained hereinabove in the specific embodiment disclosed the TDM data on each input line D1 through D17 is received at a bit rate of 2.048 MHz. That is, the time slot of each channel is 488 nanoseconds. The operation of the switching matrix in receiving and storing input data and in reading out and transmitting data must be synchronized with the input bit rate. Proper timing is obtained throughout the matrix by four phase clock pulses $p1$ through $p4$ shown as items a through d in the timing diagram of FIG. 5. The pulse rate of each series of clock pulses is 2.048 MHz. Each pulse is 61 nanoseconds and the time between a pulse of one phase and the next pulse of the adjacent phase is 61 nanoseconds. The channel counter 21 (FIG. 2) counts in synchronism and in phase with the input channel time slots as indicated in item e of FIG. 5. As shown in FIG. 5, the input channel and channel count change on the leading edge of each p3 clock pulse.

DATA INPUT AND OUTPUT

Figure 6:
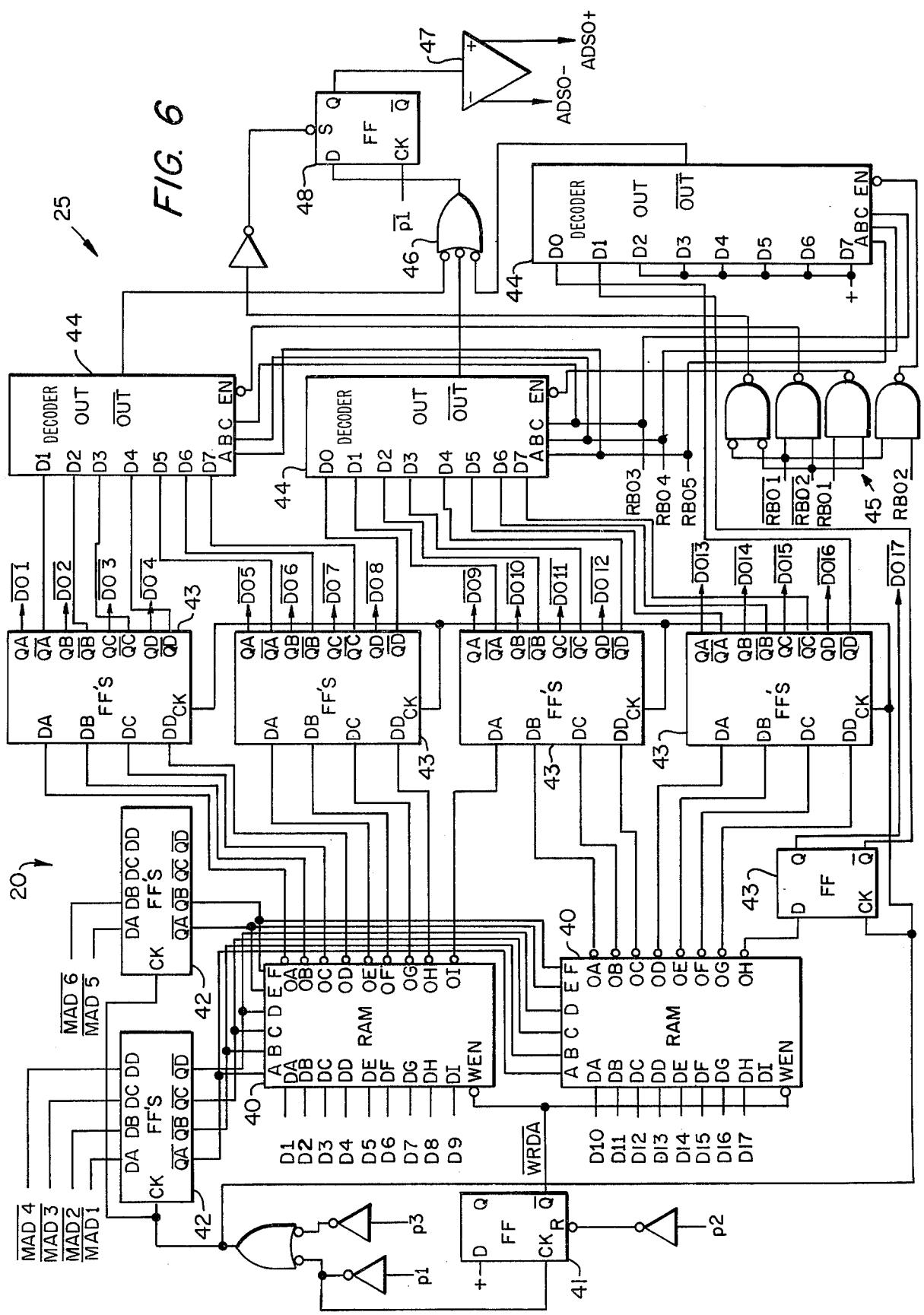
FIG. 6 is a logic diagram of the data memory section and a portion of the output section of a switching matrix.

The data memory section 20 of a switching matrix is illustrated in detail in the logic diagram of FIG. 6. The data memory section, as shown, includes a data memory 40 of two random access memory units (RAM's) arranged to receive data bits in parallel during each channel time slot on the input lines D1 through D17. The RAM's provide a 17 by 64 array of storage locations as illustrated in the chart of FIG. 4A. As stated previously all 16 data memory sections in the network are each connected to all of the input lines D1 through D17 so that the contents of the data memory 40 are the same in every matrix.

The data memory section 20 also includes a write flip-flop 41 which is triggered at the proper time to cause the data bits D1 through D17 to be written into the data memory 40. A data memory address register 42 which is an arrangement of D-type flip-flops determines which of the 64 sets of 17 storage locations of the data memory 40 is addressed. The contents of the data memory address register 42 is controlled by the memory address selection gate 22 (FIG. 2). The parallel outputs of the data memory 40 are applied to a data memory output register 43 which is an arrangement of D-type flip-flops.

The writing of the data bits D1 through D17 in the data memory 40 during each channel takes place during a write pulse $\overline{WRDA}$. The write pulse $\overline{WRDA}$ is generated by the p1 and p2 clock pulses applied to the write flip-flop 41. As illustrated by item g of FIG. 5 the write pulse $\overline{WRDA}$ occurs between clock pulses p1 and p2. During the write pulse $\overline{WRDA}$ the contents of the data memory address register 42 is the count in the channel counter as indicated by item f of FIG. 5. The manner in which the memory address selection gate 22 causes the channel count to be in the data memory address register 42 at that time will be explained hereinbelow. The data bits D1 through D17 which are present on the input lines are thereby stored in the appropriate storage locations by input channel as illustrated in FIG. 4A.

Data is read out of the data memory 40 for transmission on the output line of the matrix in the output channel (N) corresponding to the input channel (N) of the data being received if an address segment is located in the corresponding channel (N) storage location in the address memory section 24. (The manner of writing a segment of an address in an address memory section 24 has been explained briefly hereinabove and will be explained in detail hereinbelow.)

Figure 7:
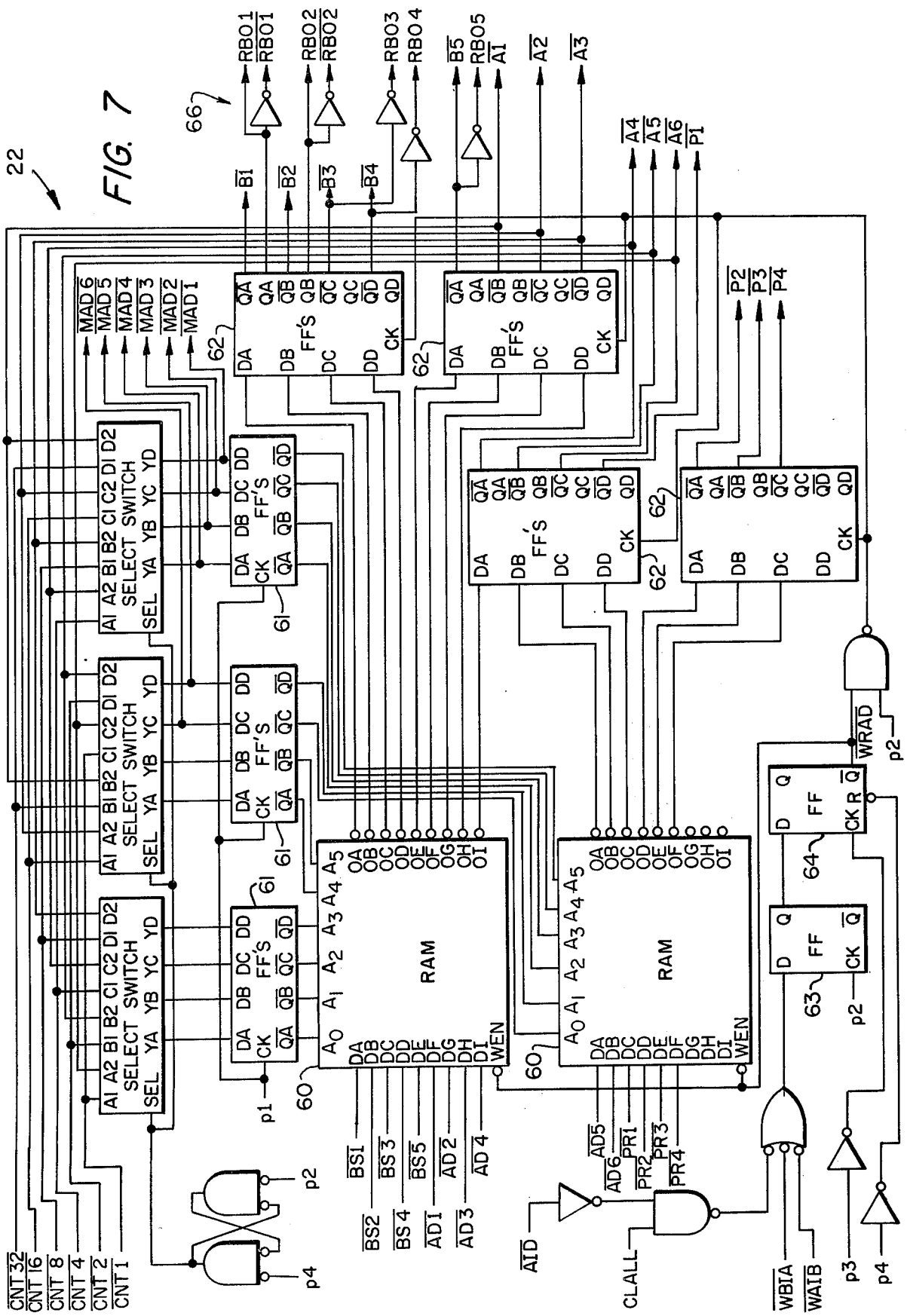
FIG. 7 is a logic diagram of a portion of the address memory section and memory address selection gate of a switching matrix.

A portion of the address memory section 24 is illustrated in detail in FIG. 7. The address memory section includes an address memory 60 of two random access memory units (RAM's) arranged to provide an array of storage locations capable of storing 64 address segments of 15 bits each. The storage arrangement is illustrated in FIG. 4B. An address memory address register 61 which is an arrangement of D-type flip-flops determines which of the 64 channel locations of the address memory 60 is addressed. The contents of the address memory address register 61 is controlled by the memory address selection gate 22. An address memory output register 62 of D-type flip-flops is connected to the parallel outputs of the address memory 60.

The memory address selection gate 22 is also shown in detail in FIG. 7. The memory address selection gate 22 is an arrangement of select switches having two sets of inputs and one set of outputs. The inputs are the count in the channel counter 21 and location address bits $\overline{A1}$ through $\overline{A6}$ from the address memory output register 62. The outputs $\overline{MAD1}$ through $\overline{MAD6}$ of the memory address selection gate 22 are applied to both the data memory address registers 42 (FIG. 6) and the address memory address register 61.

The memory address selection gate 22 is controlled by clock pulses p2 and p4 so that between pulses p2 and p4 the gate outputs $\overline{MAD1}$ through $\overline{MAD6}$ are the location address $\overline{A1}$ through $\overline{A6}$ from the address memory output registers 62 and between pulses p4 and p2 the gate outputs $\overline{MAD1}$ through $\overline{MAD6}$ are the count from the channel counter 21. Thus, on the p3 clock pulse applied to the data memory address register 42 (FIG. 6) the location address $\overline{A1}$ through $\overline{A6}$ from the address memory output registers 62 is placed in the data memory address register 42 as illustrated by item f in FIG. 5. On the p1 clock pulse applied to both the data memory address register 42 and the address memory address register 61 the channel count from the counter 21 is placed in both the data memory address register 42 and the address memory address register 61 as illustrated by items f and h of FIG. 5.

Thus, on the p1 clock pulse 150 during the N input channel time slot the count of N is entered in both the data memory address register 42 and the address memory address register 61 (items f and h of FIG. 5). On the data write pulse $\overline{WRDA}$ 151 between clock pulses p1 and p2 the data bits D1 through D17 on the N input channel are entered in the N channel storage locations of the data memory 40 as explained previously. The p2 clock pulse 152 applied to the address memory output register 62 reads out the address segment stored at the N channel location of the address memory 60, if one is present, and enters the segment in the address memory output register 62 as illustrated in item i of FIG. 5. As explained previously this address segment designates the particular data bit in the data memory 40 which is to be read out and applied to the output line of the matrix during the N output channel time slot. The address bits $\overline{A1}$ through $\overline{A6}$ identify the channel locations in the data memory 40, and the bit select bits $\overline{B1}$ through $\overline{B5}$ identify the particular one of the seventeen bits in the particular channel locations.

Also on the p2 clock pulse 152 the memory address selection gate 22 is switched to select the 6-bit address portion $\overline{A1}$ through $\overline{A6}$ of the address segment in the address memory output register 62 as its outputs $\overline{MAD1}$ through $\overline{MAD6}$. Thus on the next p3 clock pulse 153 applied to the data memory address register 42 that location address is placed in the data memory address register 42 as illustrated in item f of FIG. 5. On the leading edge of the next p1 clock pulse 154 the contents of the storage locations of the data memory 40 which are identified by the address bits $\overline{A1}$ through $\overline{A6}$ are read out of the data memory 40 and loaded into the data memory output register 43 as shown by item j of FIG. 5.

The 17 bits stored in the data memory output register 43 are applied to the output bit select decoder 25 (FIG. 6). The output bit select decoder 25 includes an arrangement of decoder units 44 having their outputs combined by a NAND gate 46. The decoder units 44 are controlled by the bit select bits $\overline{B1}$ through $\overline{B5}$ stored in the address memory output register 62. These bits are applied to the decoder units 44 by way of inverters 66 and gates 45. The output of the NAND gate 46 is applied to a D-type flip-flop 48, and the output of the flip-flop is applied to a differential amplifier 47.

The decoder units 44 under control of the signals derived from the bit select bits $\overline{B1}$ through $\overline{B5}$ in the address memory output register 62 select the proper one of the seventeen data bits stored in the data memory output register 43. On the trailing edge of the p1 clock pulse 154 this bit is placed in the flip-flop 48. The output of the flip-flop 48 is applied to the differential amplifier 47 and becomes the ADSO signal as illustrated in item k of FIG. 5.

Figure 8:
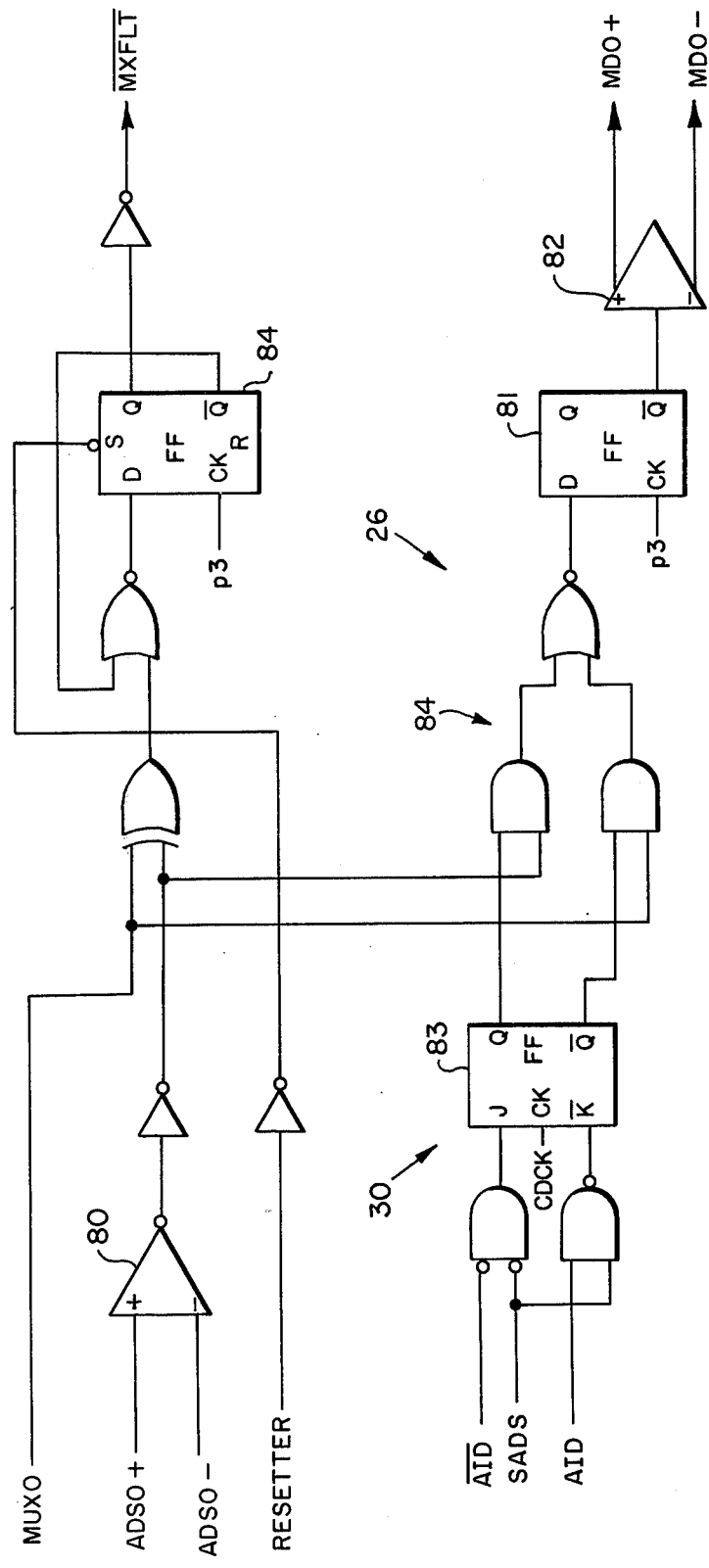
FIG. 8 is a logic diagram of a portion of the output section of a switching matrix.

The ADSO differential signal is applied to a differential amplifier 80 in the output section 26 as shown in FIG. 8. Assuming that the matrix is not operating with a command to select data from the spare matrix, the bit from the amplifier 80 is passed through a gating arrangement 84 to a D-type flip-flop 81. On the next p3 clock pulse 155 the data bit is placed in the flip-flop 81 and applied to a differential amplifier 82. The data bit appears as the output MDO of the differential amplifier 82 during the time slot of the N output channel as illustrated in item 1 of FIG. 5. This output is applied to a demultiplexer 12 as shown in FIG. 1.

ADDRESS INSTRUCTION INPUT

Figure 9:
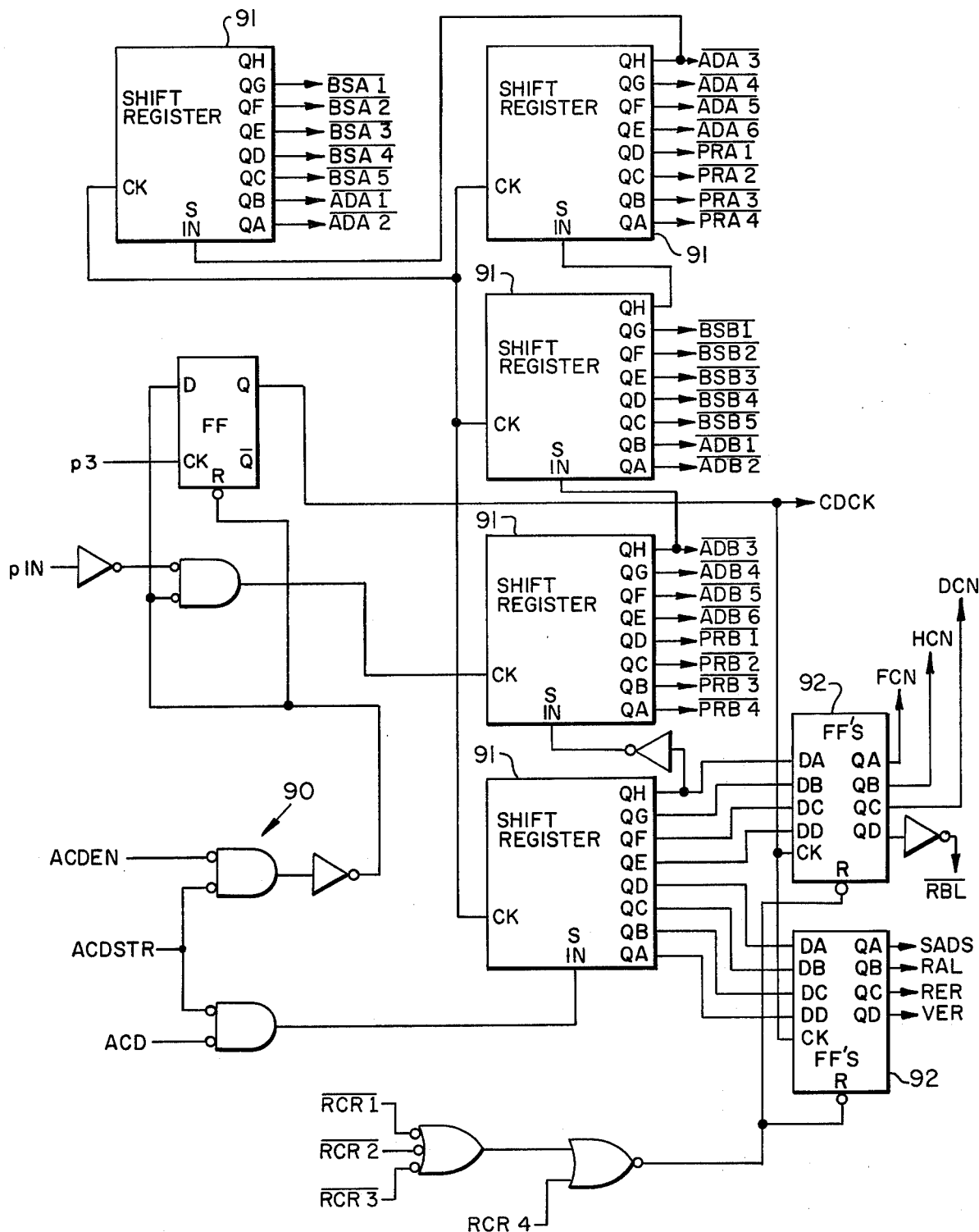
FIG. 9 is a logic diagram of an input register section of a switching matrix for receiving and storing an address instruction.

Address instructions are transmitted to all the switching matrices over an address information line ACD as shown in FIG. 9. When a gating arrangement 90 is properly enabled by ACDEN and ACDSTR signals an address instruction word having the format illustrated in FIG. 3 may be received and stored in input shift registers 91. The input shift registers 91 are clocked by pIN clock pulses at a 1.152 MHz rate. The A address segment $\overline{BSA\ 1}$ through $\overline{PRA\ 4}$ and the B address segment $\overline{BSB\ 1}$ through $\overline{PRB\ 4}$ are provided at the parallel outputs of the input shift registers 91. On the p3 clock pulse following the entering of the address instruction in the input shift registers 91 any command bits which are present are entered in D-type flip-flops 92.

The possible command bits which may be present include a full connect command FCN calling for the input channel designated by the A address segment to be connected to the output channel designated by the B address segment and also for the input channel designated by the B address segment to be connected to the output channel designated by the A address segment. In order to accomplish this command the A address segment must be stored in the address memory section of the matrix designated by the bit select bits $\overline{BSB\ 1}$ through $\overline{BSB\ 5}$ of the B address segment in the channel storage location designated by the address bits $\overline{ADB\ 1}$ through $\overline{ADB\ 6}$ of the B address segment, and the B address segment must be stored in the address memory section of the matrix designated by the bit select bits $\overline{BSA\ 1}$ through $\overline{BSA\ 5}$ of the A address segment in the channel storage location designated by the address bits $\overline{ADA\ 1}$ through $\overline{ADA\ 6}$ of the A address segment.

A half connect command HCN calls for the input channel designated by the A address segment to be connected to the output channel designated by the B address segment. The A address segment is therefore stored in the address memory section of the matrix designated by the bit select bits $\overline{BSB\ 1}$ through $\overline{BSB\ 5}$ of the B address segment in the channel storage location designated by the address bits $\overline{ADB\ 1}$ through $\overline{ADB\ 6}$ of the B address segment. For a disconnect command DCN the previously established connections involving the channels designated by the A and B address segments are terminated. All 1's are placed in the address memory sections of the matrices designated by the A and B address segments in the channel storage locations designated by the A and B address segments, respectively.

The select alternative data command bit SADS causes the matrix to select the output data bit from the spare matrix rather than that obtained by reading out its own data memory section. The readback command bit RBL causes the matrix to read out for monitoring and checking purposes the address segment being written into the address memory section. Two resetting commands RAL and RER cause portions of the matrix to be reset. A testing command VER causes a test procedure to be conducted by apparatus not shown or described herein.

Figure 10:
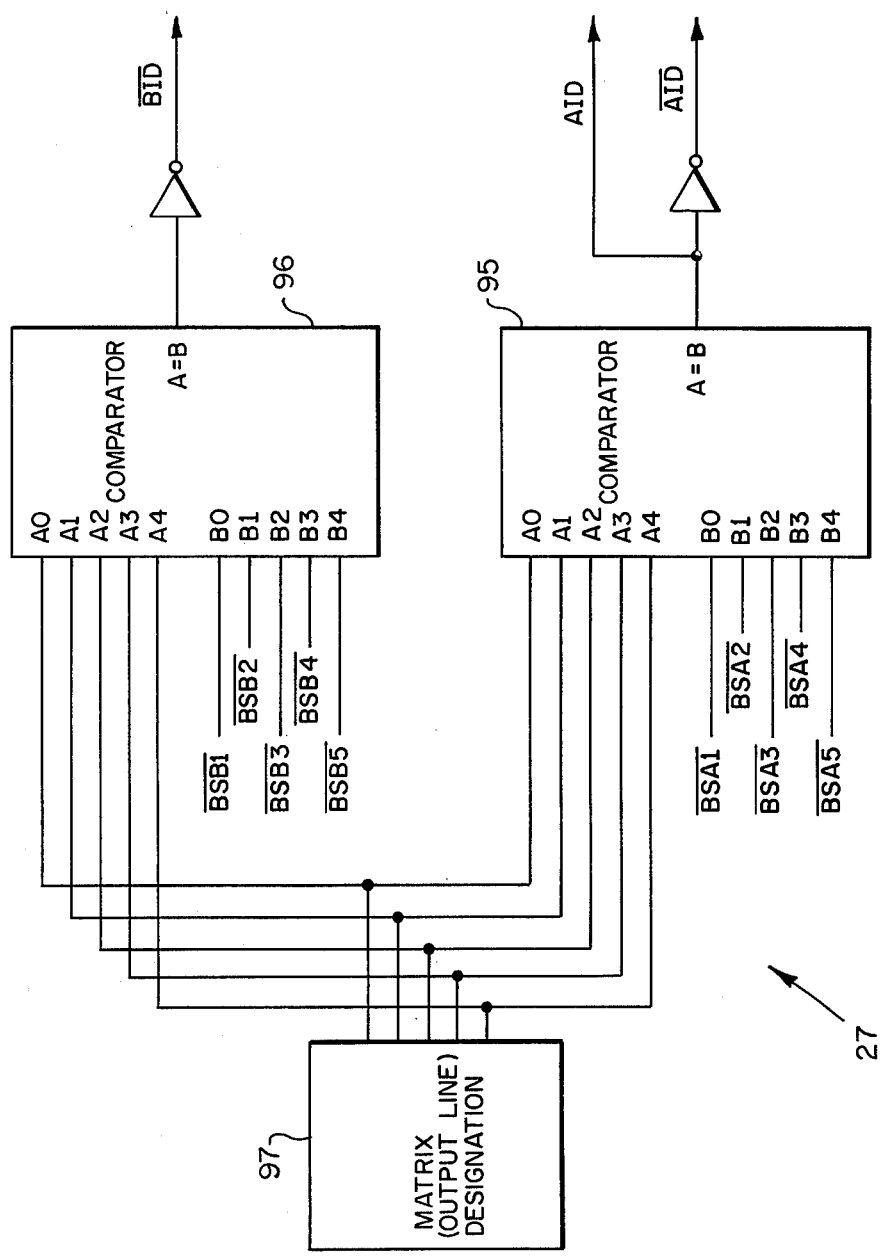
FIG. 10 is a logic diagram of a comparator of a switching matrix for determining if the stored address instruction designates the particular switching matrix and the output transmission line associated with the matrix.

The bit select portions $\overline{BSA1}$ through $\overline{BSA5}$ and $\overline{BSB1}$ through $\overline{BSB5}$ of the two address segments stored in the input shift registers 91 are applied to the bit select-matrix (output line) comparator 27 shown in detail in FIG. 10. The bit select bits $\overline{BSA1}$ through $\overline{BSA5}$ of the A address segment and the bit select bits $\overline{BSB1}$ through $\overline{BSB5}$ of the B address segment are separately compared in comparators 95 and 96, respectively, to a fixed set of digital signals from a matrix or output transmission line designation element 97. The element 97 of each matrix produces a different set of steady state signal levels which uniquely identify the matrix and therefore its output transmission line. The comparators 95 and 96 provide output signals $\overline{AID}$ or $\overline{BID}$ in response to a match thus indicating that either the A address segment or the B address segment of the address information designates the particular matrix.

Figure 11:
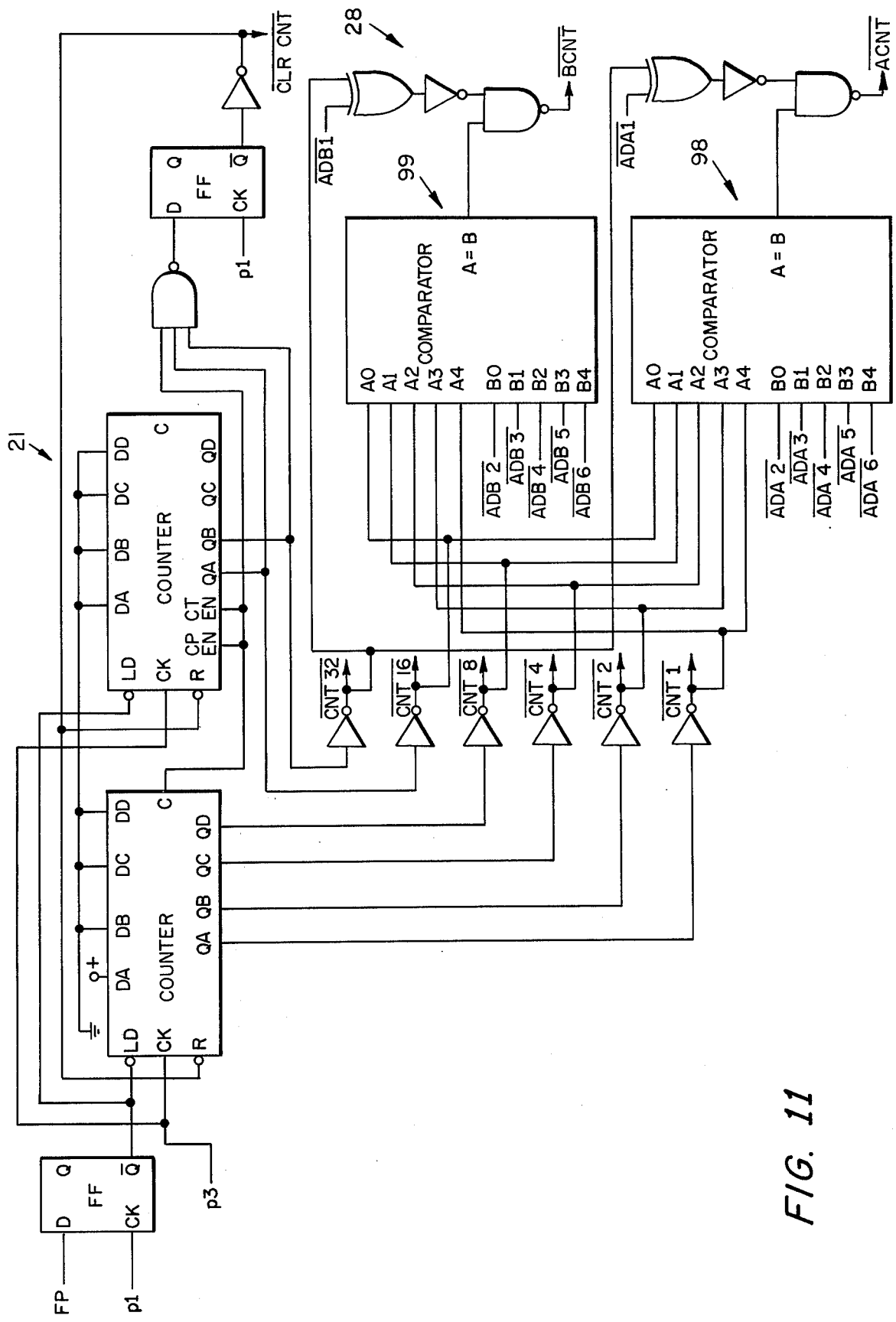
FIG. 11 is a logic diagram of a channel counter which is synchronized with the time slots of the input channels and a comparator for determining coincidence between channels designated by the stored address instruction and the count in the counter.

The address portions $\overline{ADA1}$ through $\overline{ADA6}$ and $\overline{ADB1}$ through $\overline{ADB6}$ of the two address segments stored in the input shift registers 91 are applied to the address-channel comparator 28 shown in detail in FIG. 11. The address bits of the A address and the address bits of the B address are separately compared in comparator arrangements 98 and 99 to the count from the channel counter 21. The channel counter 21 is a straightforward digital counter and is illustrated in detail in FIG. 11. The counter 21 is clocked by the p3 clock pulses as indicated by item e of FIG. 5 and its digital outputs $\overline{CNT\ 1}$ through $\overline{CNT\ 32}$ represent the count in the counter from 0 to 63. A synchronizing pulse FP applied at the start of each frame of sixty-four channels insures that the count of the counter is the same as the channel number and that all matrices are synchronized. The output of a comparator arrangement 98 or 99 appears as an $\overline{ACNT}$ or a $\overline{BCNT}$ signal during the time slot of an input channel which is designated by the address portion of the A or B address segment, respectively, as illustrated in item n of FIG. 5.

Figure 12:
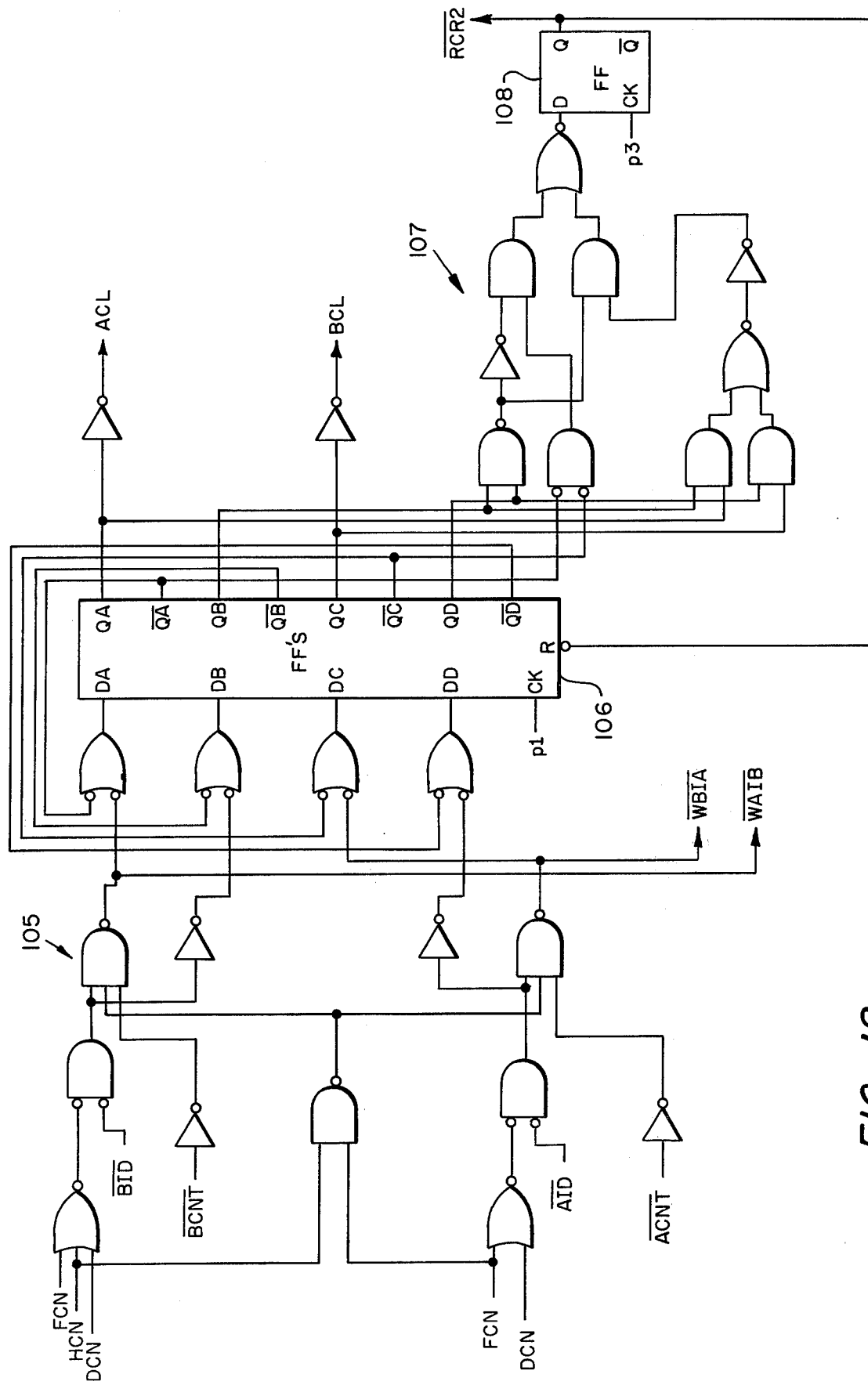
FIG. 12 is a logic diagram of portions of the control circuitry for controlling the input to the address memory.

Command signals which call for a full connection FCN, a half connection HCN, or a disconnect DCN operation are applied together with $\overline{BID}$, $\overline{AID}$, $\overline{BCNT}$, or $\overline{ACNT}$ signals to a portion of the memory input control of the address memory section which is illustrated in FIG. 12. The $\overline{BID}$ or $\overline{AID}$ signal is present if the matrix is the particular matrix designated by the bit select bitts of the B address segment or the A address segment. The FCN or HCN signal (assuming a full or half connect rather than a disconnect command) is illustrated by item m of FIG. 5. If the comparator 28 determines coincidence of the address portion of an address segment during the N input channel, a $\overline{BCNT}$ or $\overline{ACNT}$ signal is produced during the time slot of the N input channel as illustrated by item n of FIG. 5. A $\overline{BCNT}$ or $\overline{ACNT}$ signal begins on the p3 clock pulse 156 which is the start of the N count in the counter 21 and the start of the time slot of the N input channel, (item e of FIG. 5). The signals are applied to a logic arrangement 105 as shown in FIG. 12 and produce either a $\overline{WAIB}$ or a $\overline{WBIA}$ signal as shown in item o of FIG. 5. A $\overline{WAIB}$ signal indicates that the A address segment is to be written into the address memory 60 of the matrix at the N channel storage location which is that designated by the address bits $\overline{AD1}$ through $\overline{AD6}$ of the B address segment. A $\overline{WBIA}$ signal indicates that the B address segment is to be written into the address memory 60 of the matrix at the N channel storage location which is that designated by the address bits $\overline{ADA1}$ through $\overline{ADA6}$ of the A address segment.

On the following p1 clock pulse 150 information is entered in an arrangement of D-type flip-flops 106 to provide output signals ACL or BCL indicating that an A address or that a B address has been accepted by the matrix to be entered in the address memory. In addition, the data in the D-type flip-flops 106 is applied through an arrangemment of logic gates 107 to a D-type flip-flop 108 which is set on the next p3 clock pulse 153 to produce a reset signal $\overline{RCR\ 2}$. This signal resets the D-type flip-flops 92 (FIG. 9) holding the command bits and also resets the D-type flip-flops 106.

The $\overline{WAIB}$ or $\overline{WBIA}$ signal as shown in item o of FIG. 5 is applied to another portion of the address memory input control shown in FIG. 7. On the p2 clock pulse 152 following the p3 clock pulse 156 at the start of the N input channel, an address memory write flip-flop 63 of the D-type is set as shown in item q of FIG. 5. This flip-flop thus holds the information that an address segment is to be written into the address memory 60 after the reset pulse $\overline{RCR\ 2}$ and the termination of the N input channel time slot terminates the FCN or HCN, the $\overline{BCNT}$ or $\overline{ACNT}$, and the $\overline{WAIB}$ or $\overline{WBIA}$ signals as shown in items m, n, and o of FIG. 5.

Figures 13, 14:
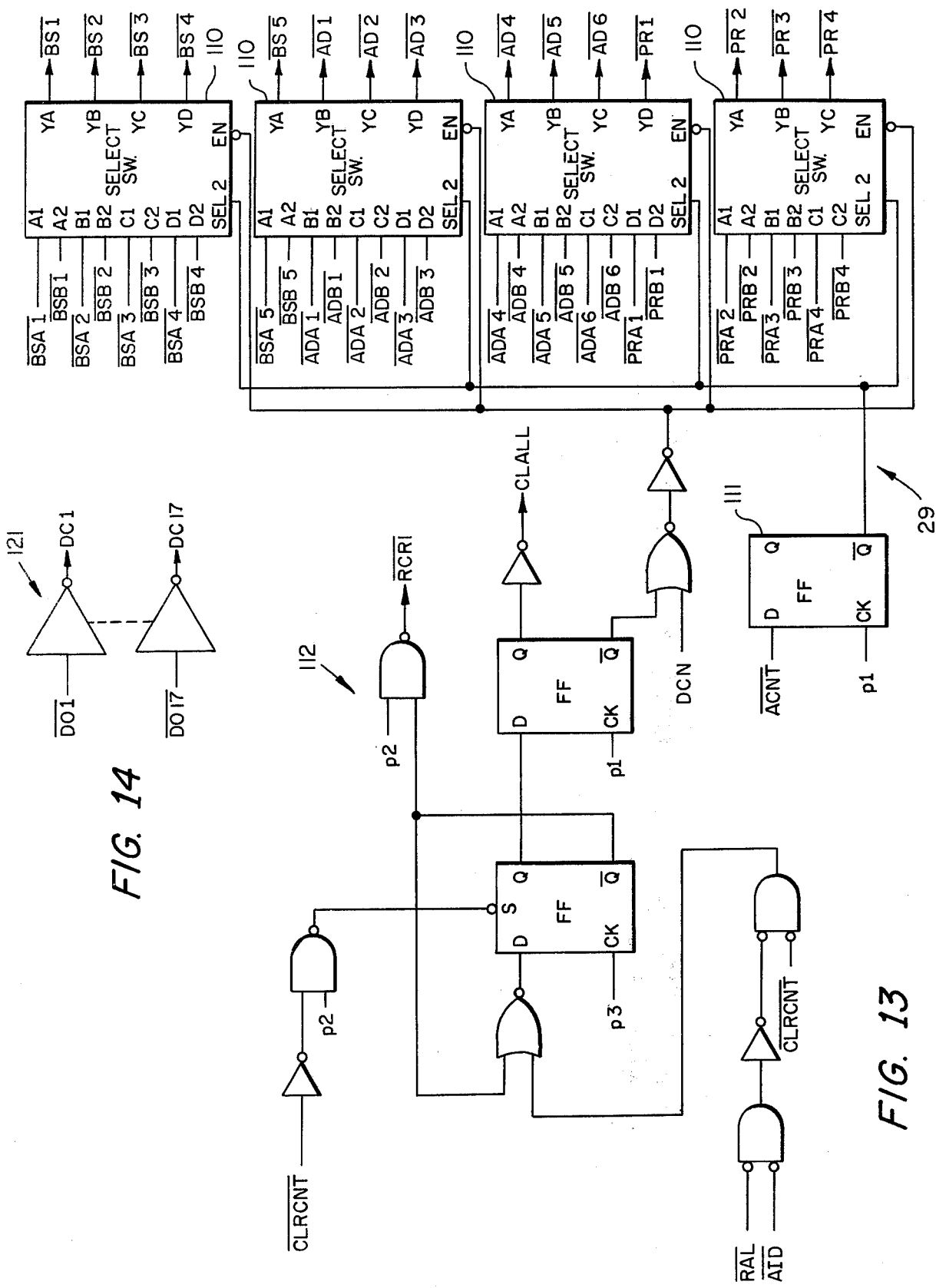
FIG. 13 is a logic diagram of a gating arrangement for selecting between different segments of the stored address instruction and a network for providing signals to clear the matrix under certain conditions.
FIG. 14 is a logic diagram of a group of inverters for inverting data signals within the matrix.

The address A-address B selection gate 29 is shown in FIG. 13. The gate includes an arrangement of select switches 110 which receive both the A and B address segments $\overline{BSA1}$ through $\overline{PRA4}$ and $\overline{BSB1}$ through $\overline{PRB4}$ from the address input registers 91. The $\overline{ACNT}$ signal is applied to a selection flip-flop 111 which is triggered by p1 clock pulses. If an $\overline{ACNT}$ signal is present, the selection flip-flop 111 produces a SEL B signal during the period between p1 clock pulses 150 and 154 as shown in item p of FIG. 5. The SEL B signal causes the select switches 110 to produce the B address segment at their outputs $\overline{BS1}$ through $\overline{PR4}$. In the absence of a SEL B signal the A address segment is present at the outputs $\overline{BS1}$ through $\overline{PR4}$ of select switches 110. The outputs $\overline{BS1}$ through $\overline{PR4}$ of the select switches 110 are applied to the address memory 60 (FIG. 7).

FIG. 13 also shows an arrangement of logic elements 112 which serve to provide reset signals to various portions of the network under certain conditions as will be explained hereinbelow. In addition, the disconnect command bit DCN is applied to the logic arrangement 112. If this bit is present, the output of the select switches 110 is such as to cause all 1's to be loaded in the address memory 60.

As stated previously the address memory write flip-flop 63 (FIG. 7) is set on the p2 clock pulse 152 as shown in item q of FIG. 5 if an address segment is to be written into the address memory 60 at the N channel storage location. The following p3 and p4 pulses 153 and 157 applied to a D-type flip-flop 64 cause a write pulse $\overline{WRAD}$ shown in item r in FIG. 5 to be applied to the address memory 60. The write pulse $\overline{WRAD}$ causes the output of the select switches 110 $\overline{BS1}$ through $\overline{PR4}$, either the A address segment or the B address segment as determined by the absence or presence of the SEL B signal, to be entered in the address memory 60. As indicated by item h in FIG. 5 during the write pulse $\overline{WRAD}$ the address memory register 61 contains the count of N. Therefore, the address segment $\overline{BS1}$ through $\overline{PR4}$ is entered in the N channel storage location of the address memory 60.

In summary, if the full connection command bit FCN is present, the A address segment is placed in the address memory of the matrix and at the storage location designated by the B address segment, and the B address segment is placed in the address memory of the matrix and at the storage location designated by the A address segment. If the half connection command bit HCN is present, only the A address segment is placed in the address memory of the matrix and at the storage location designated by the B address segment. If the disconnect command bit DCN is present, the storage locations of the address memories of the matrices designated by both the A and the B address segments are loaded with 1's to, in effect, remove any existing address information. Thus, the appropriate address information is placed in, or removed from, the proper locations of the proper address memories 60 so that during each channel sequence the proper data bits are read out of the data memories 40 and entered in the proper channel time slot of the proper output line.

SPARE MEMORY

In the event that the data in the data memory section of one of the 15 matrices 1–15 is faulty or the data memory section is inoperative, the data stored in the data memory section of the spare switching matrix (FIG. 1) may be employed to read out the data designated by an A address segment to be transmitted on the channel designated by a B address segment. An address instruction designating the output line of the spare switching matrix is accepted by the spare matrix and causes the spare matrix to produce the proper MUXO signal during the output channel time slots when the matrix of the data memory sections being bypassed would otherwise produce an ADSO signal.

A select alternative data source command bit SADS is included in the command portion of an address instruction accepted by the defective matrix. When the J-K flip-flop 83 of the alternative data selection gate 30 shown in FIG. 8 of the defective matrix detects the SADS command bit and the $\overline{AID}$ signal, it causes the gating arrangement 84 to pass the MUXO signal which is the data bit from the output bit select decoder 25 of the spare matrix rather than the ADSO signal which is the data bit from its own output bit select decoder. In the absence of the SADS command bit the ADSO signal passes through the gating arrangement 84 and a MUXO signal, if present, is blocked.

ERROR CHECKING, MONITORING, AND RESETTING

Figure 15:
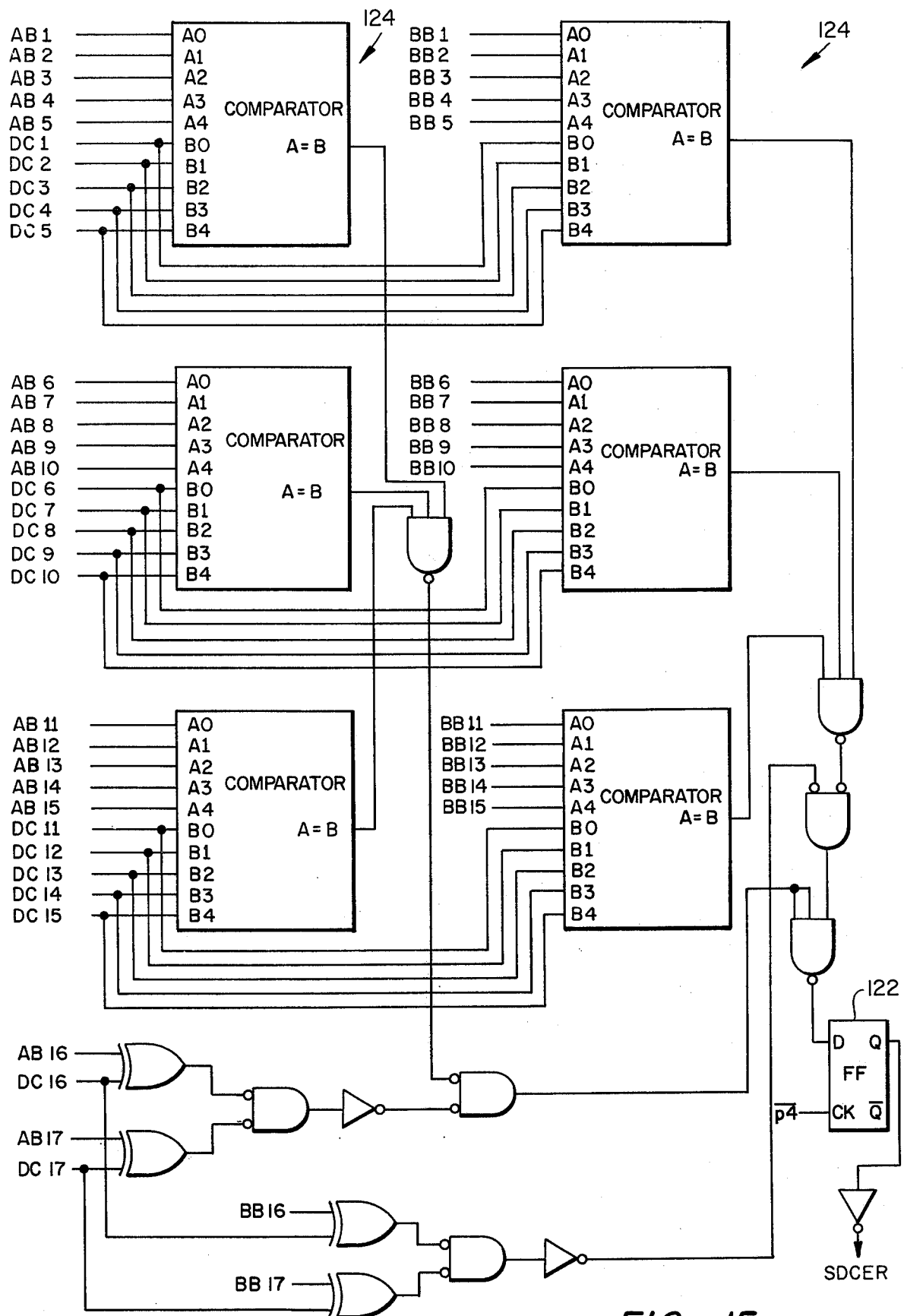
FIG. 15 is a logic diagram of a portion of an error checking section of the matrix for checking the data in the data memory with that in the data memories of other matrices.

Various subsystems are provided in the error checking section 30 of each switching matrix for checking its operation. FIG. 15 shows data field checking circuitry by which the contents of the data memory 40 is checked against that of two adjacent matrices. The outputs $\overline{DO1}$ through $\overline{DO17}$ of the data memory output register 43 of FIG. 6 are inverted by an arrangement of inverters 121 as shown in FIG. 14 to produce signals DC1 through DC17 which are applied to an arrangement of comparators 124. Signals AB1 through AB17 and BB1 through BB17 are equivalent signals from the data memory output registers 43 of two other matrices of the network.

As shown in FIG. 5 and as explained previously, on the $\overline{WRDA}$ pulse 151 (item g) the 17 data bits of the N input channel are written into the data memory 40 at the N channel locations since the data memory address register 42 contains the count of N. On the next p3 clock pulse 153 this new data received on input channel N is placed in the data memory output register 43 (item j). The data from the three data memory output registers is applied to the comparators 124. On the next p4 clock pulse 157 a D-type flip-flop 122 is triggered if the data from all three data memories is not the same.

Figure 18:
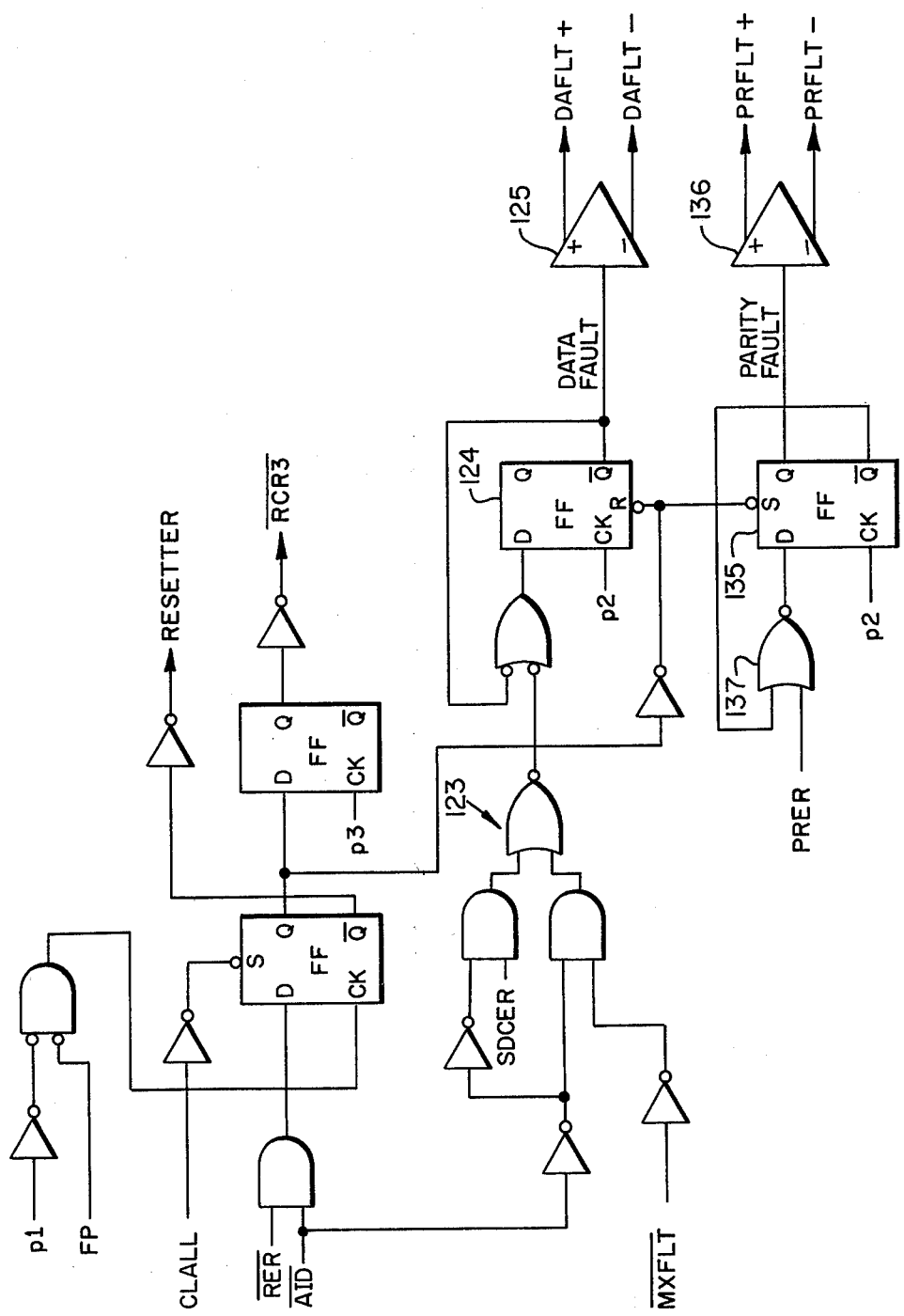
FIG. 18 is a logic diagram of other portions of the error detection section within a matrix.

If the flip-flop 122 is triggered indicating an error in the data field of a matrix, it produces an SDCR signal which is applied to a gating arrangement 123 in FIG. 18. On the subsequent p2 clock pulse 158 a D-type flip-flop 124 is triggered producing a DATA FAULT signal. This signal is applied to a differential amplifier 125 which produces a fault indication DAFLT.

Figures 16, 17:
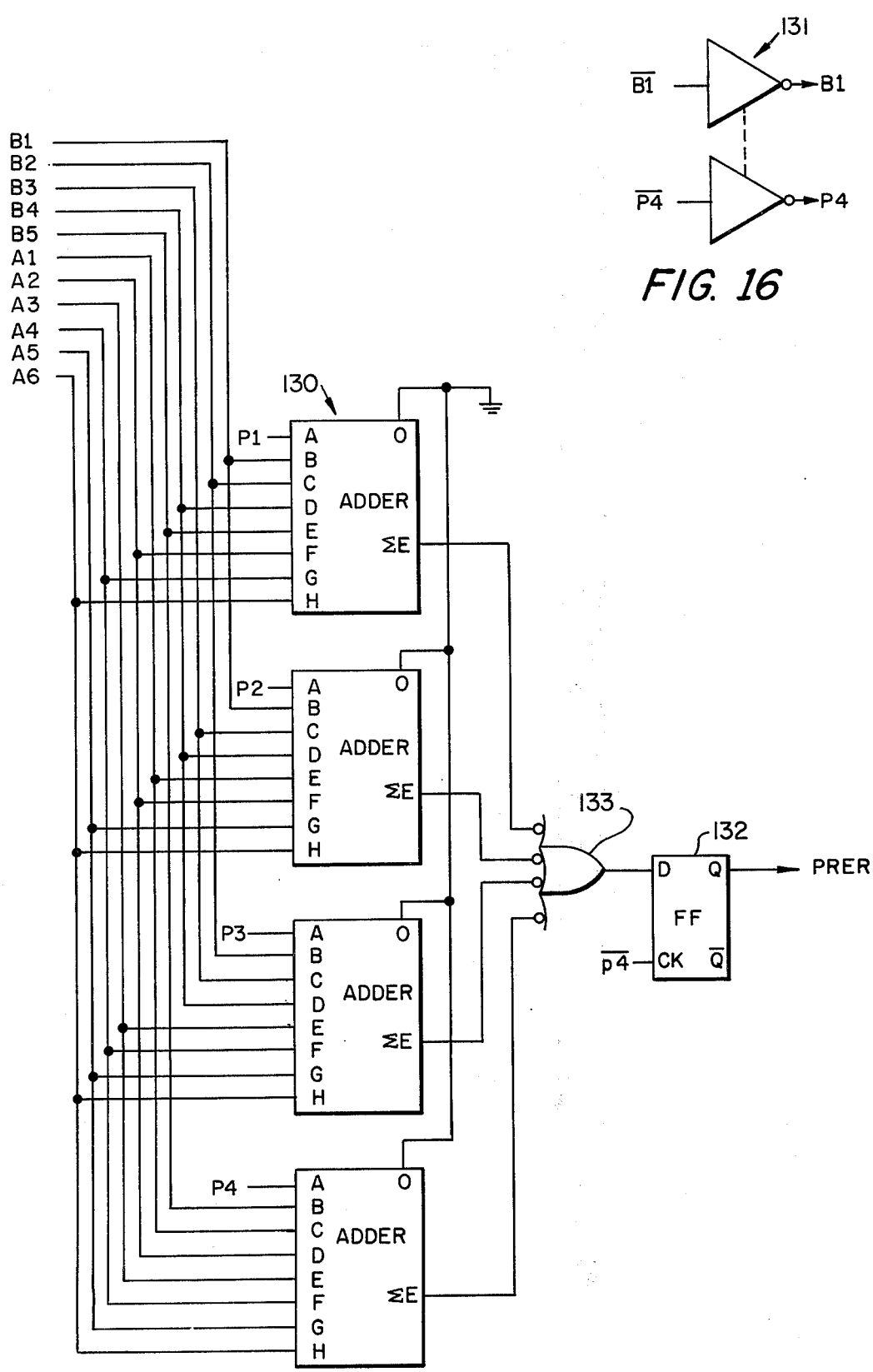
FIG. 16 is a logic diagram of a group of inverters for inverting address instruction signals within the matrix.
FIG. 17 is a logic diagram of parity checking circuitry within the error checking section of a matrix.

FIG. 17 illustrates the circuitry for making a parity check of an address segment stored in the address memory output register 62. The output bits $\overline{B1}$ through $\overline{P4}$ from the address memory output register 62 are applied to an arrangement of inverters 131 shown in FIG. 16. The inverter signals B1 through P4 are applied to an arrangement of adders 130 in the manner shown in FIG. 17. The outputs of the individual adders are combined by a NAND gate 133. If parity is satisfied, there is no effect on a D-type flip-flop 132. If parity is not satisfied for an address segment in the address memory output register 62 which designates the location address of data for output channel N (item i of FIG. 5), on the p4 clock pulse 157 flip-flop 132 is set. The output of flip-flop 132 PRER is applied, as shown in FIG. 18, to a D-type flip-flop 135 by way of a NOR gate 137. On the subsequent p2 clock pulse 158 the flip-flop 135 produces a PARITY FAULT signal. This signal is applied to a differential amplifier 136 which produces a PRFLT signal. This signal indicating a parity fault is available to the system for taking action prior to the occurrence of the time slot of the N output channel (item 1 of FIG. 5).

Circuitry for conducting another check of the operation of the matrix is shown in FIG. 8. In the event that the data bit of either the ADSO signal or the MUXO signal is present at an improper time as determined by the p3 clock pulse 155 at the start of the N output channel time slot an $\overline{MXFLT}$ signal is produced by a D-type flip-flop 85. The $\overline{MXFLT}$ signal together with the $\overline{AID}$ signal is applied to the logic arrangement 123 shown in FIG. 18. The combination of the two signals causes the flip-flop 124 to produce a DATA FAULT signal. As explained previously the DATA FAULT signal causes a DAFLT output signal to be produced by the amplifier 125.

Figure 19:
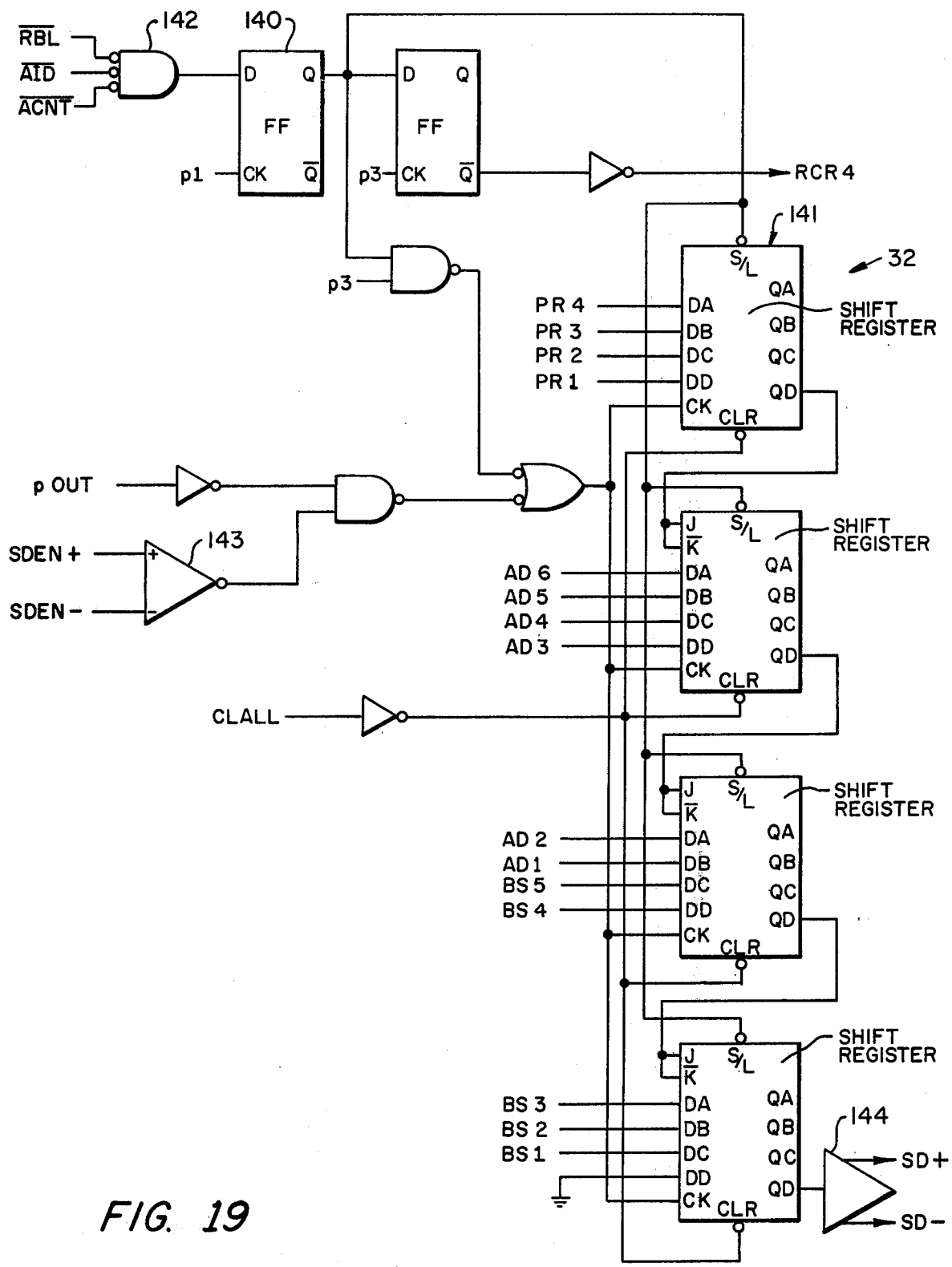
FIG. 19 is a logic diagram of a readback section for permitting a segment of the address instruction to be read out of the address memory.

Circuitry for reading back an address segment for verification or other monitoring purposes is shown in the readback section 32 of FIG. 19. The outputs of the select switches 110 $\overline{BS1}$ through $\overline{PR4}$ (FIG. 13) applied to the address memory 60 (FIG. 7) are inverted and applied as parallel inputs to shift registers 141. The readback command bit $\overline{RBL}$ together with the $\overline{AID}$ and $\overline{ACNT}$ signals are applied to a flip-flop 140 through a NAND gate 142. If all three signals are present, on the p1 clock pulse 150 flip-flop 140 is set loading the address segment in the shift register 141. If an enabling signal SDEN is present at the input to a differential amplifier 143, pOUT pulses are gated to the shift registers 141. The pOUT pulses are at the 1.152 MHz rate and clock the address segment out of the shift register 141 in serial bit format. The serial bit output of the shift register 141 is passed through a differential amplifier 144 to produce a differential output SD.

Each matrix also includes circuitry for clearing or resetting the matrix in response to resetting command bits $\overline{RAL}$ or $\overline{RER}$ being present in the address instruction. The $\overline{\text{RAL}}$ resetting signal when applied to the logic arrangement 112 of FIG. 13 together with the $\overline{\text{AID}}$ signal produces a clearing signal CLALL. In addition it produces a resetting signal $\overline{\text{RCR1}}$ to command register 92 (FIG. 9) and causes the select switches 110 to produce all 1's. The CLALL signal is applied to the address memory section 24 causing the memory to write the all 1's from select switches 110 into the memory at every channel location. That is, the entire contents of the address memory are erased. The CLALL signal also is applied to the readback section 32 and to a portion of the error checking section 31 (FIG. 10) to clear or reset these circuits. The $\overline{\text{RER}}$ signal occurs after a DAFLT or a PRFLT signal has been produced and resets the error checking circuitry. The $\overline{\text{RER}}$ signal together with the $\overline{\text{AID}}$ signal is applied to the error checking circuitry of FIG. 18 to produce resetting signals $\overline{\text{RCR3}}$ and RESETTER for clearing the command register 92 (FIG. 9) and the flip-flop 85 (FIG. 8) which produces the $\overline{\text{MXFLT}}$ signal.

While there has been shown and described what is considered a preferred embodiment of the present invention, it will be obvious to those skilled in the art that various changes and modifications may be made therein without departing from the invention as defined by the appended claims.

What is claimed is:

1. In a communication system including a plurality of input transmission lines for carrying time division multiplexed digital signals in a predetermined number of input channels on each input transmission line and a plurality of output transmission lines for carrying time division multiplexed digital signals in an equal predetermined number of output channels on each output transmission line, a time division switching network for establishing connections between selected input channels of selected input transmission lines and selected output channels of selected output transmission lines comprising an address information line for transmitting digital address information words each having a first segment designating a particular one of each of said pluralities of transmission lines and a particular one of said predetermined number of channels of each transmission line and a second segment designating a particular one of each of said pluralities of transmission lines and a particular one of said predetermined number of channels of each transmission line;

a plurality of switching matrices, each switching matrix being coupled to each of the plurality of input transmission lines and to a different one of said plurality of output transmission lines, and each switching matrix including:

data memory means coupled to each of said plurality of input transmission lines and capable of storing a digital signal for each input channel of each input transmission line at a corresponding storage location;

address memory means capable of storing a segment of an address information word for each output channel of the associated one of said output transmission lines at a corresponding storage location;

address input storage means coupled to said address information line for receiving and storing a digital address information word transmitted on said address information line;

first address comparison means for producing an indication when the second segment of an address information word stored in said address input storage means designates the associated output transmission line;

second address comparison means for producing an indication designating the particular channel designated by the second segment of an address information word stored in said address input storage means;

address memory input control means coupled to the address input storage means, to the first address comparison means, to the second address comparison means, and to the address memory means for causing the address memory means in response to indications from the first and second address comparison means to store the first segment of the address information word;

memory address control means coupled to the data memory means and to the address memory means for addressing the respective storage locations in recurring sequence by corresponding channels and causing the data memory means to store digital signals at the storage locations corresponding to the associated input channel, said memory address control means causing the first segment of an address information word being stored in the address memory means to be stored in the storage location corresponding to the channel designated by the second segment of the address information word;

address memory output means coupled to the address memory means for reading out the first segment of an address information word stored at the storage location addressed by the memory address control means;

said memory address control means being coupled to the address memory output means for addressing the storage locations of the data memory means corresponding to the channel designated by the first segment of an address information word read out of the address memory means by the address memory output means; and data output means coupled to the data memory means for reading out the digital signals at the storage locations in the data memory means addressed by the memory address control means and corresponding to the channel designated by the first segment of the address information word read out of the address memory means, for selecting the particular digital signal associated with the particular input transmission line designated by the first segment of the address information word read out of the address memory means, and for applying the selected digital signal to the associated output transmission line in the output channel designated by the second segment of the address information word.

2. In a communication system, a time division switching network in accordance with claim 1 wherein each switching matrix includes counting means for producing a count for each input channel of said predetermined number in recurring sequence and in fixed time relationship with the time slot for each input channel;

said second address comparison means being coupled to said counting means and to said address input storage means and operable to produce said indication in response to a count N from the counting means being the same as the particular number N of the channel designated by the second segment of an address information word stored in said address input storage means; and said memory address control means being coupled to said counting means and being operable in response to a count N from the counting means to address the respective storage locations of the data memory means and the address memory means corresponding to the N channel.

3. In a communication system, a time division switching network in accordance with claim 2 wherein said address memory output means is operable to read out the first segment of an address information word stored at the storage location addressed by the memory address control means while the memory address control means addresses the storage location corresponding to the N channel having the same number as the count N from said counting means;

said memory address control means is operable to cause the storage locations of the data memory means corresponding to the channel designated by the first segment of an address information word read out of the address memory means by the address memory output means to be addressed during a time period having a fixed relationship with the time period of the count of N from said counting means; and said data output means is operable to apply said selected digital signal to the associated output transmission line during a time period having a fixed relationship with the time period of the count of N from said counting means.

4. In a communication system, a time division switching network in accordance with claim 3 wherein said memory address control means includes data memory address register means coupled to said data memory means for containing an address which addresses the storage locations of the data memory means corresponding to a single channel;

address memory address register means coupled to said address memory means for containing an address which addresses a storage location of the address memory means corresponding to a single channel; and memory address selection means coupled to said counting means, to said address memory output means, to said data memory address register means, and to said address memory address register means;

said memory address selection means being operable to cause an address corresponding to a count N from said counter means to be present in said data memory address register means while digital signals from the N input channel are being stored in the data memory means and to cause an address corresponding to the channel designated by the first segment of an address information word read out of the address memory means by the address memory output means to be present in said data memory address register means while digital signals are read out of the data memory means by said data output means; and said memory address selection means being operable to cause the address corresponding to a count from said counter means to be present in said address memory address register means while the first segment of an address input word is being stored in the address memory means.

5. In a communication system, a time division switching network in accordance with claim 4 wherein the first segment of an address information word has a first portion designating a particular one of each of said pluralities of transmission lines and a second portion designating a particular one of said predetermined number of channels of each transmission line;

the second segment of an address information word has a first portion designating a particular one of each of said pluralities of transmission lines and a second portion designating a particular one of said predetermined number of channels of each transmission line;

said first address comparison means produces said indication when the first portion of the second segment of an address information word stored in said address input storage means designates the associated output transmission line;

said second address comparison means produces said indication designating the particular channel designated by the second portion of the second segment of an address information word stored in said address input storage means;

said memory address selection means is operable to receive the second portion of the first segment of an address information word read out of the address memory means and to cause an address corresponding to the channel designated by said second portion to be present in said data memory address register means while digital signals are read out of the data memory means by said data output means; and said data output means includes means coupled to said address memory output means for selecting the particular digital signal associated with the particular input transmission line designated by the first portion of the first segment of the address information word read out of the address memory means from the digital signals read out of the data memory means.

6. In a communication system, a time division switching network in accordance with claim 1 including an additional switching matrix including:

data memory means coupled to each of said plurality of input transmission lines and capable of storing a digital signal for each input channel of each input transmission line at a corresponding storage location;

address memory means capable of storing a segment of an address information word for each output channel of an output transmission line at a corresponding storage location;

address input storage means coupled to said address information line for receiving and storing a digital address information word transmitted on said address information line;

first address comparison means for producing an indication when the second segment of an address information word stored in said address input storage means designates the output line associated with said additional switching matrix;

second address comparison means for producing an indication designating the particular channel designated by the second segment of an address information word stored in said address input storage means;

address memory input control means coupled to the address input storage means, to the first address comparison means, to the second address comparison means, and to the address memory means for causing the address memory means in response to indications from the first and second address comparison means to store the first segment of the address information word;

memory address control means coupled to the data memory means and to the address memory means for addressing the respective storage locations in recurring sequence by corresponding channels and causing the data memory means to store digital signals at the storage locations corresponding to the associated input channel, said memory address control means causing the first segment of an address information word being stored in the address memory means to be stored in the storage location corresponding to the channel designated by the second segment of the address information word;

address memory output means coupled to the address memory means for reading out the first segment of an address information word stored at the storage location addressed by the memory address control means;

said memory address control means being coupled to the address memory output means for addressing the storage locations of the data memory means corresponding to the channel designated by the first segment of an address information word read out of the address memory means by the address memory output means;

data output means coupled to the data memory means for reading out the digital signals at the storage locations in the data memory means addressed by the memory address control means and corresponding to the channel designated by the first segment of the address information word read out of the address memory means, for selecting the particular digital signal associated with the particular input transmission line designated by the first segment of the address information word read out of the address memory means, and for applying the selected digital signal to an output line coupled to the data output means of each of the plurality of switching matrices in the output channel designated by the second segment of the address information word;

said address information words having an alternative data command portion which when present indicates that the data bit designated by the first segment of the address information word is to be read out of the data memory of the additional matrix and applied to the output transmission line and in the output channel designated by the second segment of the address information word;

the address input storage means of each of said plurality of matrices being operable to receive and store a digital address information word including said alternative data command portion; and each of said plurality of matrices including an output data selection means coupled to said address input storage means and to said data output means and operable in response to said alternative data command being present to cause the output section to apply the selected digital signal on the output line from the additional switching matrix to the associated output transmission line in place of the selected digital signal obtained from the digital signals read out of the data output means.

7. In a communication system, a time division switching network in accordance with claim 1 wherein
said address information words have a readback command portion which when present indicates that the segment of an address word being stored in the address memory is to be read out;
said address input storage means being operable to receive and store a digital address information word including said readback command portion;
and each switching matrix includes
readback means coupled to the address memory means and to the address input storage means and having an output line, said readback means being operable in response to said readback command portion being present to store the segment of an address information word while it is being stored in the address memory means and to read out the segment on its output line.

8. In a communication system, a time division switching network in accordance with claim 1 wherein each switching matrix includes
comparison readout means coupled to the data memory means for reading out the digital signals at the storage locations in the data memory means addressed by the memory address control means in recurring sequence by corresponding channels; and
data comparison means coupled to the comparison readout means and to the comparison readout means of another switching matrix of the plurality;
said data comparison means being operable to compare the digital signals for each channel read out of the data memory means by the comparison readout means with the digital signals for the same channel read out of the data memory means of said other switching matrix by its comparison readout means and to produce an indication if the digital signals are not the same.

9. In a communication system including a plurality of input transmission lines for carrying time division multiplexed digital signals in a predetermined number of input channels on each input transmission line and a plurality of output transmission lines for carrying time division multiplexed digital signals in an equal predetermined number of output channels on each output transmission line, a time division switching network for establishing connections between selected input channels of selected input transmission lines and selected output channels of selected output transmission lines comprising
an address information line for transmitting digital address information words each having a first segment designating a particular one of each of said pluralities of transmission lines and a particular one of said predetermined number of channels of each transmission line and a second segment designating a particular one of each of said pluralities of transmission lines and a particular one of said predetermined number of channels of each transmission line;
a plurality of switching matrices, each switching matrix being coupled to each of the plurality of input transmission lines and to a different one of said plurality of output transmission lines, each switching matrix including:

data memory means coupled to each of said plurality of input transmission lines and capable of storing a digital signal for each input channel of each input transmission line at a corresponding storage location;

address memory means capable of storing a segment of an address information word for each output channel of the associated one of said output transmission lines at a corresponding storage location;

address input storage means coupled to said address information line for receiving and storing a digital address information word transmitted on said address information line;

first address comparison means having a first section for producing a first indication when the first segment of an address information word stored in said address input storage means designates the associated output transmission line and having a second section for producing a second indication when the second segment of an address information word stored in said address input storage means designates the associated output transmission line;

second address comparison means having a first section for producing a first indication designating the particular channel designated by the first segment of an address information word stored in said address input storage means and having a second section for producing a second indication designating the particular channel designated by the second segment of an address information word stored in said address input storage means;

address memory input control means coupled to the address input storage means, to the first address comparison means, to the second address comparison means, and to the address memory means for causing the address memory means in response to first indications from the first sections of the first and second address comparison means to store the second segment of the address information word and for causing the address memory means in response to second indications from the second sections of the first and second address comparison means to store the first segment of the address information word;

memory address control means coupled to the data memory means and to the address memory means for addressing the respective storage locations in recurring sequence by corresponding channels and causing the data memory means to store digital signals at the storage locations corresponding to the associated input channels, said memory address control means causing the first segment of an address information word being stored in the address memory means to be stored in the storage location corresponding to the channel designated by the second segment of the address information word and causing the second segment of an address information word being stored in the address memory means to be stored in the storage location corresponding to the channel designated by the first segment of the address information word;

address memory output means coupled to the address memory means for reading out the segment of an address information word stored at the storage location addressed by the memory address control means;

said memory address control means being coupled to the address memory output means for addressing the storage locations of the data memory means corresponding to the channel designated by the segment of an address information word read out of the address memory means by the address memory output means; and data output means coupled to the data memory means for reading out the digital signals at the storage locations in the data memory means addressed by the memory address control means and corresponding to the channel designated by the segment of the address information word read out of the address memory means, for selecting the particular digital signal associated with the particular input transmission line designated by the segment of the address information word read out of the address memory means, and for applying the selected digital signal to the associated output transmission line in the output channel corresponding to the storage location of the address memory means from which the segment of the address information word was read out.

10. In a communication system, a time division switching network in accordance with claim 9 wherein each switching matrix includes counting means for producing a count for each input channel of said predetermined number in recurring sequence and in fixed time relationship with the time slot for each input channel;

said first section of said second address comparison means being coupled to said counting means and to said address input storage means and operable to produce said first indication in response to a count N from the counting means being the same as the particular number N of the channel designated by the first segment of an address information word stored in said address input storage means;

said second section of said second address comparison means being coupled to said counting means and to said address input storage means and operable to produce said second indication in response to a count N from the counting means being the same as the particular number N of the channel designated by the second segment of an address information word stored in said address input storage means; and said memory address control means being coupled to said counting means and being operable in response to a count N from the counting means to address the respective storage locations of the data memory means and the address memory means corresponding to the N channel.

11. In a communication system, a time division switching network in accordance with claim 10 wherein said address memory output means is operable to read out the segment of an address information word stored at the storage location addressed by the memory address control means while the memory address control means addresses the storage location corresponding to the N channel having the same number as the count N from said counting means;

said memory address control means is operable to cause the storage locations of the data memory means corresponding to the channel designated by the segment of an address information word read out of the address memory means by the address memory output means to be addressed during a time period having a fixed relationship with the time period of the count of N from said counting means; and said data output means is operable to apply said selected digital signal to the associated output transmission line during a time period having a fixed relationship with the time period of the count of N from said counting means.

12. In a communication system, a time division switching network in accordance with claim 11 wherein said address memory input control means includes address memory input selection means coupled to the address input storage means, to the second address comparison means, and to the address memory means;

said address memory input selection means being operable to apply the second segment of the address information word to the address memory means causing the second segment to be stored in the address memory means if the first section of the second address comparison means produces said first indication and being operable to apply the first segment of the address information word to the address memory means causing the first segment to be stored in the address memory means if the second section of the second address comparison means produces said second indication.

13. In a communication system, a time division switching network in accordance with claim 12 wherein said memory address control means includes data memory address register means coupled to said data memory means for containing an address which addresses the storage locations of the data memory means corresponding to a single channel;

address memory address register means coupled to said address memory means for containing an address which addresses a storage location of the address memory means corresponding to a single channel; and memory address selection means coupled to said counting means, to said address memory output means, to said data memory address register means, and to said address memory address register means;

said memory address selection means being operable to cause an address corresponding to a count N from said counter means to be present in said data memory address register means while digital signals from the N input channel are being stored in the data memory means and to cause an address corresponding to the channel designated by the segment of an address information word read out of the address memory means by the address memory output means to be present in said data memory address register means while digital signals are read out of the data memory means by said data output means; and said memory address selection means being operable to cause the address corresponding to a count from said counter means to be present in said address memory address register means while the segment of an address input word is being stored in the address memory means.

14. In a communication system, a time division switching network in accordance with claim 13 wherein the first segment of an address information word has a first portion designating a particular one of each of said pluralities of transmission lines and a second portion designating a particular one of said predetermined number of channels of each transmission line;

the second segment of an address information word has a first portion designating a particular one of each of said pluralities of transmission lines and a second portion designating a particular one of said predetermined number of channels of each transmission line;

said first section of said first address comparison means produces said first indication when the first portion of the first segment of an address information word stored in said address input storage means designates the associated output transmission line;

said second section of said first address comparison means produces said second indication when the first portion of the second segment of an address information word stored in said address input storage means designates the associated output transmission line;

said first section of said second address comparison means produces said first indication designating the particular channel designated by the second portion of the first segment of an address information word stored in said address input storage means;

said second section of said second address comparison means produces said second indication designating the particular channel designated by the second portion of the second segment of an address information word stored in said address input storage means;

said memory address selection means is operable to receive the second portion of the segment of an address information word read out of the address memory means and to cause an address corresponding to the channel designated by said second portion to be present in said data memory address register means while digital signals are read out of the data memory means by said data output means; and said data output means includes means coupled to said address memory output means for selecting the particular digital signal associated with the particular input transmission line designated by the first portion of the segment of the address information word read out of the address memory means from the digital signals read out of the data memory means.

15. In a communication system, a time division switching network in accordance with claim 9 including an additional switching matrix including:

data memory means coupled to each of said plurality of input transmission lines and capable of storing a digital signal for each input channel of each input transmission line at a corresponding storage location;

address memory means capable of storing a segment of an address information word for each output channel of the associated one of said output transmission lines at a corresponding storage location;

address input storage means coupled to said address information line for receiving and storing a digital address information word transmitted on said address information line;

first address comparison means having a first section for producing a first indication when the first segment of an address information word stored in said address input storage means designates the output line associated with said additional switching matrix and having a second section for producing a second indication when the second segment of an address information word stored in said address input storage means designates the output line associated with said additional switching matrix;

second address comparison means having a first section for producing a first indication designating the particular channel designated by the first segment of an address information word stored in said address input storage means and having a second section for producing a second indication designating the particular channel designated by the second segment of an address information word stored in said address input storage means;

address memory input control means coupled to the address input storage means, to the first address comparison means, to the second address comparison means, and to the address memory means for causing the address memory means in response to first indications from the first sections of the first and second address comparison means to store the second segment of the address information word and for causing the address memory means in response to second indications from the second sections of the first and second address comparison means to store the first segment of the address information word;

memory address control means coupled to the data memory means and to the address memory means for addressing the respective storage locations in recurring sequence by corresponding channels and causing the data memory means to store digital signals at the storage locations corresponding to the associated input channel, said memory address control means causing the first segment of an address information word being stored in the address memory means to be stored in the storage location corresponding to the channel designated by the second segment of the address information word and causing the second segment of an address information word being stored in the address memory means to be stored in the storage location corresponding to the channel designated by the first segment of the address information word;

address memory output means coupled to the address memory means for reading out the segment of an address information word stored at the storage location addressed by the memory address control means;

said memory address control means being coupled to the address memory output means for addressing the storage locations of the data memory means corresponding to the channel designated by the segment of an address information word read out of the address memory means by the address memory output means;

data output means coupled to the data memory means for reading out the digital signals at the storage locations in the data memory means addressed by the memory address control means and corresponding to the channel designated by the segment of the address information word read out of the address memory means, for selecting the particular digital signal associated with the particular input transmission line designated by the segment of the address information word read out of the address memory means, and for applying the selected digital signal to an output line coupled to the data output means of each of the plurality of switching matrices in the output channel corresponding to the storage location of the address memory means from which the segment of the address information word was read out;

said address information words having an alternative data command portion which when present indicates that the data bit designated by the segment of the address information word read out of the address memory means is to be read out of the data memory of the additional matrix and applied to the output transmission line and in the output channel corresponding to the storage location of the address memory means from which the segment of the address information word was read out;

the address input storage means of each of said plurality of matrices being operable to receive and store a digital address information word including said alternative data command portion; and each of said plurality of matrices including an output data selection means coupled to said address input storage means and to said data output means and operable in response to said alternative data command being present to cause the output section to apply the selected digital signal on the output line from the additional switching matrix to the associated output transmission line in place of the selected digital signal obtained from the digital signals read out of the data output means.

16. In a communication system, a time division switching network in accordance with claim 9 wherein said address information words have a readback command portion which when present indicates that one of the segments of an address word being stored in the address memory is to be read out;

said address input storage means being operable to receive and store a digital address information word including said readback command portion;

and each switching matrix includes readback means coupled to the address memory means and to the address input storage means and having an output line, said readback means being operable in response to said readback command portion being present to store the one of the segments of an address information word while it is being stored in the address memory means and to read out the one of the segments on its output line.

17. In a communication system, a time division switching network in accordance with claim 9 wherein each switching matrix includes comparison readout means coupled to the data memory means for reading out the digital signals at the storage locations in the data memory means addressed by the memory address control means in recurring sequence by corresponding channels; and data comparison means coupled to the comparison readout means and to the comparison readout means of another switching matrix of the plurality;

said data comparison means being operable to compare the digital signals for each channel read out of the data memory means by the comparison readout means with the digital signals for the same channel read out of the data memory means of said other switching matrix by its comparison readout means and to produce an indication if the digital signals are not the same.

* * * * *